(12) United States Patent
Yu et al.

(10) Patent No.: US 12,740,517 B2
(45) **Date of Patent: *Sep. 22, 2026**

(54) BLOWING SUCTION DEVICE

(71) Applicant: Positec Power Tools (Suzhou) Co., Ltd, Suzhou (CN)

(72) Inventors: Xuefeng Yu, Suzhou (CN); Shiping Jiao, Suzhou (CN)

(73) Assignee: Positec Power Tools (Suzhou) Co., LTD., Suzhou (CN)

(*) Notice: Subject to any disclaimer, the term of this patent is extended or adjusted under 35 U.S.C. 154(b) by 21 days.

This patent is subject to a terminal disclaimer.

(21) Appl. No.: 18/372,518

(22) Filed: Sep. 25, 2023

(65) Prior Publication Data

US 2024/0008426 A1 Jan. 11, 2024

Related U.S. Application Data

(60) Division of application No. 16/897,120, filed on Jun. 9, 2020, now Pat. No. 11,766,001, which is a (Continued)

(30) Foreign Application Priority Data

Dec. 12, 2017 (CN) ......................... 201711316309.1

(51) Int. Cl.
*A01G 20/47* (2018.01)
*A47L 5/14* (2006.01)
(Continued)

(52) U.S. Cl.
CPC ................ *A01G 20/47* (2018.02); *A47L 5/14* (2013.01); *F04D 23/003* (2013.01); *F04D 25/084* (2013.01); *F04D 25/105* (2013.01)

(58) Field of Classification Search
CPC ..... A47L 5/14; A47L 5/28; E01H 1/08; F04D 25/084; F04D 25/105
See application file for complete search history.

(56) References Cited

U.S. PATENT DOCUMENTS 5,440,781 A 8/1995 Kitazawa et al.
6,843,639 B2 1/2005 Schütt
(Continued)

FOREIGN PATENT DOCUMENTS

CN 200996139 Y 12/2007
CN 101135139 A 3/2008
(Continued)

OTHER PUBLICATIONS

Poirinatu, Blowing and Sucking Machine—(Machine Translation of CN101205708A (Year: 2006).*
(Continued)

*Primary Examiner* — Kenneth J Hansen
(74) *Attorney, Agent, or Firm* — Lee & Hayes, P.C.

(57) ABSTRACT

A single-tube blower vacuum includes a body, an airflow generation apparatus, a collection apparatus, and a blowing-suction tube. The airflow generation apparatus has an air inlet portion and an air outlet portion. The airflow generation apparatus is rotatably mounted on the body. The airflow generation apparatus rotates relative to the body to enable the single-tube blower vacuum to switch between a suction mode and a blowing mode. In the suction mode, the air inlet portion of the airflow generation apparatus is in fluid communication with a first end of the blowing-suction tube, and the air outlet portion of the airflow generation apparatus is in fluid communication with a connection port of the collection apparatus. In the blowing mode, the air outlet portion of the airflow generation apparatus is in fluid communication with the first end of the blowing-suction tube.

19 Claims, 21 Drawing Sheets

Related U.S. Application Data continuation of application No. PCT/CN2018/120684, filed on Dec. 12, 2018.

(51) Int. Cl.

| | |
|---|---|
| ***F04D 23/00*** | (2006.01) |
| ***F04D 25/08*** | (2006.01) |
| ***F04D 25/10*** | (2006.01) |

(56) References Cited

U.S. PATENT DOCUMENTS

| | | | |
|---|---|---|---|
| 7,870,640 | B2 | 1/2011 | Hinklin et al. |
| 9,131,643 | B2 | 9/2015 | Hoffman et al. |
| 9,420,924 | B2 | 8/2016 | Svoboda et al. |
| 2009/0241285 | A1 | 10/2009 | Hinklin et al. |

FOREIGN PATENT DOCUMENTS

| | | | | |
|---|---|---|---|---|
| CN | 101205708 | | | 6/2008 |
| CN | 101205708 | A | * | 6/2008 |
| CN | 102425133 | A | | 4/2012 |
| CN | 202626913 | U | | 12/2012 |
| CN | 104367265 | A | | 2/2015 |
| CN | 204728250 | U | | 10/2015 |
| CN | 204919445 | U | | 12/2015 |
| EP | 2803260 | A1 | | 11/2014 |

OTHER PUBLICATIONS

Second Office Action in CN application No. 201811519229.0 , dated Mar. 1, 2024.

Second Office Action in CN application No. 201811519230.3 , dated Mar. 4, 2024.

Second search in CN application No. 201811519229.0 , dated Mar. 1, 2024.

Second search in CN application No. 201811519230.3 , dated Mar. 4, 2024.

Poirinatu, Blowing and Sucking Machine—(Machine Translation) ‘CN101205708A_MT.pdf’, Jun. 2008 (Year: 2008).

* cited by examiner

BLOWING SUCTION DEVICE

This application is a divisional application of U.S. patent application Ser. No. 16/897,120 filed Jun. 9, 2020, which is a continuation bypass of PCT/CN2018/120684 filed Dec. 12, 2018, which claims benefit of Chinese Patent Application No. 201711316309.1 filed Dec. 12, 2017, the contents of which are all hereby incorporated by reference herein in their entirety.

BACKGROUND

Technical Field

The present invention relates to, and in particular, to a single-tube blower vacuum.

Related Art

In some existing blower vacuums, a blowing tube and a suction tube are detached and assembled alternately to implement switching between blowing and suction. In such a solution, a user needs to detach a blowing tube and a suction tube during use, resulting in complex operations, undesirable human-machine interaction, and inconvenient use.

SUMMARY

In view of the foregoing status in the prior art, one objective of the present invention is to provide a single-tube blower vacuum, so that it is not necessary to detach a blowing tube and a suction tube in switching between blowing and suction, and an operation of switching between blowing and suction is simple.

To achieve the foregoing objective, the technical solution adopted in the embodiments of the present disclosure is a blower vacuum, having a blowing mode and a suction mode, and including:

a body, including a holding portion to be held by an operator;

an airflow generation apparatus, connected to the body, and including a motor, a fan driven by an output shaft of the motor and generating an airflow, and a volute surrounding the fan, the volute including an air inlet portion and an air outlet portion in communication with the outside; and a blowing-suction tube, having a tube opening in communication with the outside to admit or discharge air, where the volute is pivotally disposed relative to the holding portion and is rotatable between a blowing position in the blowing mode and a suction position in the suction mode, when the volute rotates to the blowing position, an airflow flows into an inner cavity of the volute from the air inlet portion and flows into the blowing-suction tube from the air outlet portion of the volute, and when the volute rotates to the suction position, an airflow enters the volute from the tube opening and flows out from the air outlet portion.

In one of the implementations, the holding portion extends longitudinally along a first axis, the blowing-suction tube extends longitudinally along a second axis, and when the volute rotates to switch between the blowing mode and the suction mode, an angle formed between the first axis and the second axis remains unchanged.

In one of the implementations, the blowing-suction tube is a single-cavity air tube, and when the blower vacuum is in the blowing mode or the suction mode, an extending direction of the blowing-suction tube remains unchanged.

In one of the implementations, the air inlet portion includes an air inlet opening capable of being in communication with the outside in the blowing mode, and the air outlet portion includes an air outlet opening allowing a sucked foreign object to flow outside; and the fan includes an air inlet side perpendicular to the output shaft of the motor and an air outlet side parallel to the output shaft of the motor, in the blowing mode, the air inlet opening is located right above the air inlet side, and the air outlet opening is located in front of the air outlet side, and in the suction mode, the air inlet opening is located in front of the air inlet side, and the air outlet opening is located right below the air outlet side.

In one of the implementations, the airflow generation apparatus is an independent integral structure, and when the blower vacuum switches between the blowing mode and the suction mode, the independent integral structure is integrally rotatable relative to the holding portion.

In one of the implementations, the blower vacuum further includes a blowing-suction switching mechanism, and the blowing-suction switching mechanism operably drives the airflow generation apparatus to pivot around a rotational axis A relative to the holding portion.

In one of the implementations, the blowing-suction switching mechanism includes a toggle, and the blowing-suction tube includes a first end near the airflow generation apparatus, when the blower vacuum switches from the suction mode to the blowing mode, the toggle controls the first end of the blowing-suction tube to be disengaged from the air inlet portion, and when the blower vacuum switches from the blowing mode to the suction mode, the toggle controls the first end of the blowing-suction tube to be disengaged from the air outlet portion.

In one of the implementations, the blowing-suction switching mechanism further includes an operation component pivotally mounted on the body, and the operation component operably drives the airflow generation apparatus to rotate to the blowing position or the suction position.

In one of the implementations, the body includes a main unit housing connected to the holding portion, the main unit housing is provided with a body air inlet portion and a blowing-suction tube connecting portion for mounting the blowing-suction tube, and the body air inlet portion is located below the holding portion.

To achieve the foregoing objective, the technical solution further adopted in the embodiments of the present disclosure is a blower vacuum, having a blowing mode and a suction mode, and including:

a body, including a holding portion and a main unit housing connected to the holding portion, the main unit housing being provided with an opening in communication with the outside;

an airflow generation apparatus, connected to the main unit housing, and including a motor, a fan driven by an output shaft of the motor and generating an airflow, and a volute surrounding the fan, the volute including an air inlet portion and an air outlet portion in fluid communication with the opening; and a blowing-suction tube, having a tube opening in communication with the outside to admit or discharge air, where the volute is pivotally disposed relative to the main unit housing and is rotatable between a blowing position in the blowing mode and a suction position in the suction mode, when the volute rotates to the blowing position, an airflow flows into an inner cavity of the volute from the air inlet portion and flows into the blowing-suction tube from the air outlet portion of the volute, and when the volute rotates to the suction position, an airflow enters the inner cavity of the volute from the tube opening and flows out from the air outlet portion.

In one of the implementations, the holding portion and the main unit housing are integrally disposed.

In one of the implementations, the main unit housing is provided with a front-end opening and a rear-end opening penetrating in an extending direction of the blowing-suction tube, and the airflow generation apparatus at least partially extends backward and is exposed from an outer side of the rear-end opening.

In one of the implementations, the blower vacuum includes a collection apparatus detachably connected to the air outlet portion, and the collection apparatus is at least partially located right below the air outlet portion.

To achieve the foregoing objective, the technical solution adopted in the embodiments of the present disclosure is a single-tube blower vacuum, including: a body; an airflow generation apparatus for generating an airflow, connected to the body; a collection apparatus used for collecting debris; and a blowing-suction tube, connected to the body, where the airflow generation apparatus has an air inlet portion and an air outlet portion, the airflow generation apparatus is rotatably mounted on the body, the airflow generation apparatus is enabled to rotate relative to the body to enable the single-tube blower vacuum to switch between a suction mode and a blowing mode, in the suction mode, the air inlet portion of the airflow generation apparatus is in fluid communication with a connection port of the collection apparatus, and in the blowing mode, the air outlet portion of the airflow generation apparatus is in fluid communication with a first end of the blowing-suction tube.

In one of the implementations, a cross-sectional area of an air inlet channel of the air inlet portion in a direction perpendicular to an air inlet direction of the air inlet channel is greater than a cross-sectional area of an air outlet channel of the air outlet portion in a direction perpendicular to an air outlet direction thereof.

In one of the implementations, the blowing-suction tube is a straight tube, and a second end of the blowing-suction tube is formed with a tilted opening tilting in an extending direction of the blowing-suction tube.

In one of the implementations, the body further includes a body air inlet portion, and in the blowing mode, the air inlet portion of the airflow generation apparatus is in fluid communication with the body air inlet portion.

In one of the implementations, in the suction mode, the air inlet portion of the airflow generation apparatus is in direct communication with the first end of the blowing-suction tube, the air outlet portion of the airflow generation apparatus is in direct communication with the connection port of the collection apparatus, and in the blowing mode, the air outlet portion of the airflow generation apparatus is in direct communication with the first end of the blowing-suction tube, and the air inlet portion of the airflow generation apparatus is in direct communication with the body air inlet portion.

In one of the implementations, the airflow generation apparatus includes: a motor; a fan driven by the motor; and a volute surrounding the fan, the volute including the air inlet portion and the air outlet portion of the airflow generation apparatus.

In one of the implementations, the single-tube blower vacuum further includes a rotation driving portion used for driving the volute to rotate, and the rotation driving portion is connected to the volute and is exposed from the body.

In one of the implementations, in the suction mode, and the air inlet portion is sleeved over the first end of the blowing-suction tube from the periphery of the first end of the blowing-suction tube.

In one of the implementations, in the blowing mode, the air outlet portion is clamped at the blowing-suction tube through a clamping groove formed in the air outlet portion.

In one of the implementations, the air outlet portion includes an inner tube, an outer fastening portion, and a clamping groove defined between the inner tube and the outer fastening portion, and in the blowing mode, a circumferential wall of the first end of the blowing-suction tube is clamped in the clamping groove.

In one of the implementations, the single-tube blower vacuum further includes a toggle, the toggle is pivotally mounted on the body at a middle position of the toggle, a first end of the toggle is pivotally connected to the blowing-suction tube, and a second end of the toggle is exposed from the body, and the second end of the toggle is pushed to enable the toggle to rotate relative to the body, and the first end of the toggle drives the blowing-suction tube to move toward or away from the airflow generation apparatus.

In one of the implementations, the single-tube blower vacuum further includes a linkage apparatus for linking the rotation of the airflow generation apparatus and an axial movement of the blowing-suction tube toward or away from the airflow generation apparatus, and the linkage apparatus includes a crank connecting rod mechanism and a Geneva mechanism.

In one of the implementations, the crank connecting rod mechanism converts a continuous rotation into the axial movement of the blowing-suction tube, and the Geneva mechanism converts the continuous rotation into intermittent rotation of the airflow generation of the airflow generation apparatus relative to the body.

In one of the implementations, the linkage apparatus includes a connecting rod, a rotary disk, a convex rod, and a linkage member, a first end of the connecting rod is connected to the blowing-suction tube, a second end of the connecting rod is connected to an eccentric position of the rotary disk, the rotary disk is rotatably mounted on the body and includes an arc-shaped surface, the convex rod is fastened to the rotary disk, the linkage member is fastened to the airflow generation apparatus, and the linkage member includes a first sliding surface and a second sliding surface matching the arc-shaped surface and a slot joined to the convex rod.

In one of the implementations, the single-tube blower vacuum further includes a switching assisting apparatus, the switching assisting apparatus is disposed around a rotational axis of the airflow generation apparatus, the switching assisting apparatus includes an energy accumulation portion, when the single-tube blower vacuum switches between the suction mode and the blowing mode, the energy accumulation portion accumulates energy resisting the weight application of the airflow generation apparatus and surrounding a torque of the rotational axis, and the accumulated energy can help the airflow generation apparatus to rotate along the weight application of the airflow generation apparatus and in a direction opposite a rotational direction of the rotational axis.

In one of the implementations, the energy accumulation portion is a spring.

In one of the implementations, the spring is a torsion spring.

In one of the implementations, the torsion spring is disposed around the rotational axis, the switching assisting apparatus further includes a torsion spring limit portion disposed on the body and an abutting portion disposed at the airflow generation apparatus, when the single-tube blower vacuum switches from the suction mode to the blowing mode, the abutting portion abuts an arm of the torsion spring to accumulate energy in the torsion spring, and when the single-tube blower vacuum switches from the blowing mode to the suction mode, the energy accumulated in the torsion spring assists the airflow generation apparatus in rotation.

To achieve the foregoing objective, the technical solution further adopted in the embodiments of the present disclosure is a blower vacuum, having a blowing mode and a suction mode, and including:

- a body, including a holding portion to be held by an operator;
- an airflow generation apparatus, connected to the body, and including a motor, a fan driven by an output shaft of the motor and generating an airflow, and a volute surrounding the fan, the volute including an air inlet portion and an air outlet portion in communication with the outside; and
- a blowing-suction tube, having a tube opening that is in communication with the outside and is used for admitting or discharging air, the blowing-suction tube being provided at a first end near the airflow generation apparatus; and
- a collection apparatus, used for collecting a foreign object blown out from the air outlet portion,
- the air inlet portion including an air inlet opening for an external airflow to enter an inner cavity of the volute, the air outlet portion including an air outlet opening capable of being connected to the collection apparatus, where
- the volute is pivotally disposed relative to the holding portion and is at least rotatable between a blowing position in the blowing mode and a suction position in the suction mode, when the volute rotates to the blowing position, the air outlet opening is opposite the first end of the blowing-suction tube, and when the volute rotates to the suction position, the air inlet opening is joined to and in communication with the first end of the blowing-suction tube.

In one of the implementations, the volute rotates counterclockwise or clockwise around a rotational axis A relative to the holding portion by 70 degrees to 110 degrees, to enable the blower vacuum to be in the blowing mode or the suction mode.

In one of the implementations, when the blower vacuum switches from the suction mode to the blowing mode, the volute rotates counterclockwise around the rotational axis A by 90 degrees, and when the blower vacuum switches from the blowing mode to the suction mode, the volute rotates clockwise around the rotational axis A by 90 degrees.

In one of the implementations, the airflow generation apparatus is an independent integral structure, the blower vacuum further includes a blowing-suction switching mechanism, and the blowing-suction switching mechanism operably drives the airflow generation apparatus to rotate around the rotational axis A between the blowing position in the blowing mode and the suction position in the suction mode.

In one of the implementations, the blowing-suction tube includes a first sub-blowing-suction tube formed with the tube opening and a second sub-blowing-suction tube disposed between the tube opening and the airflow generation apparatus, the second sub-blowing-suction tube operably displaces in an axial direction, and the second sub-blowing-suction tube has a first position near the airflow generation apparatus and a second position away from the airflow generation apparatus, when the second sub-blowing-suction tube is at the first position and the blower vacuum is in the blowing mode, the second sub-blowing-suction tube is opposite the air outlet portion, and when the second sub-blowing-suction tube is at the first position and the blower vacuum is in the suction mode, the second sub-blowing-suction tube is joined to the air inlet portion.

In one of the implementations, both when the blower vacuum is in the blowing mode and when the blower vacuum is in the suction mode, an axial distance between the foremost end of the tube opening and the rotational axis A remains unchanged.

In one of the implementations, the blowing-suction switching mechanism includes a toggle controlling the second sub-blowing-suction tube to move toward the first position or controlling the second sub-blowing-suction tube to move toward the second position, and the toggle is pivotally connected to the body.

In one of the implementations, the blowing-suction switching mechanism further includes an operation component pivotally mounted on the body, and when the second sub-blowing-suction tube is at the second position, the operation component operably drives the airflow generation apparatus to rotate to the blowing position or the suction position.

In one of the implementations, the blower vacuum further includes a switching assisting apparatus connected between the body and the airflow generation apparatus, and the switching assisting apparatus includes a first retaining portion connected to the body, a second retaining portion connected to the airflow generation apparatus, and an elastic portion connected between the first retaining portion and the second retaining portion, when the blower vacuum is in the blowing mode, the elastic portion is in a stretched state, and when the blower vacuum switches from the blowing mode to the suction mode, the elastic portion uses a restoring force thereof and coordinates with the blowing-suction switching mechanism to drive the airflow generation apparatus to rotate.

In one of the implementations, the switching assisting apparatus is an extension spring.

In one of the implementations, the airflow generation apparatus is an independent integral structure, and when the blower vacuum switches between the blowing position and the suction position, the motor does not rotate relative to the fan, and the motor is in a rotatable state relative to the body.

In one of the implementations, the body includes a main unit housing connected to the holding portion, the main unit housing is provided with a hollowed-out opening in communication with the outside, the air inlet portion of the airflow generation apparatus is in fluid communication with the opening, the main unit housing is provided with a front-end opening and a rear-end opening penetrating in an extending direction of the blowing-suction tube, and the airflow generation apparatus at least partially extends backward and is exposed from an outer side of the rear-end opening.

To achieve the foregoing objective, the technical solution further adopted in the embodiments of the present disclosure is a blower vacuum, having a blowing mode and a suction mode, and including:

a body, including a holding portion to be held by an operator and a main unit housing connected to the holding portion, the main unit housing being provided with an opening in communication with the outside;

an airflow generation apparatus, connected to the main unit housing, and including a motor, a fan driven by an output shaft of the motor and generating an airflow, and a volute surrounding the fan, the volute including an air inlet portion and an air outlet portion in communication with the outside;

a blowing-suction tube, having a tube opening in communication with the outside to admit or discharge air, the blowing-suction tube being provided at a first end near the airflow generation apparatus; and a collection apparatus, used for collecting a foreign object blown out from the air outlet portion, the air inlet portion including an air inlet opening in fluid communication with the opening in the blowing mode, and the air outlet portion including an air outlet opening capable of being connected to the collection apparatus in the suction mode, where the volute is pivotally disposed relative to the main unit housing and is at least rotatable between a blowing position in the blowing mode and a suction position in the suction mode, when the volute rotates to the blowing position, the air outlet opening is opposite the first end of the blowing-suction tube, and when the volute rotates to the suction position, the air inlet opening is joined to and in communication with the first end of the blowing-suction tube.

In one of the implementations, the holding portion and the main unit housing are integrally disposed.

To achieve the foregoing objective, the technical solution further adopted in the embodiments of the present disclosure is a blower vacuum, having a blowing mode and a suction mode, and including:

an airflow generation apparatus, including a motor, a fan driven by the motor to generate an airflow, and a volute surrounding the fan, the motor including a motor body and a motor output shaft extending from the motor body, the volute including an air inlet portion and an air outlet portion that are in communication, the air inlet portion including an air inlet opening capable of being in communication with the outside in the blowing mode, and the air outlet portion including an air outlet opening allowing a sucked foreign object to flow outside in the suction mode; and a blowing-suction tube, having a tube opening in communication with the outside to admit or discharge air, where the volute and the blowing-suction tube operably move relative to each other, to enable the blower vacuum to switch between the blowing mode and the suction mode, a rotational axis of the motor output shaft basically coincides with a rotational axis of the fan, in the blowing mode, an extending direction of the motor output shaft is basically consistent with an extending direction of the air inlet portion, and an extending direction of the air outlet portion is perpendicular to the extending direction of the motor output shaft, and in the suction mode, the extending direction of the motor output shaft is basically consistent with an extending direction of the blowing-suction tube, and the extending direction of the air outlet portion is perpendicular to the extending direction of the motor output shaft.

In one of the implementations, the fan includes an air inlet side perpendicular to the motor output shaft and an air outlet side parallel to the motor output shaft, and in the blowing mode, the air inlet opening is located right above the air inlet side.

In one of the implementations, in the blowing mode, the extending direction of the blowing-suction tube is basically consistent with the extending direction of the air outlet portion.

In one of the implementations, in the suction mode, the tube opening is located right in front of the air inlet opening, and the rotational axis of the motor output shaft, the rotational axis of the fan, and a central axis of the blowing-suction tube basically coincide.

In one of the implementations, in the suction mode, the air outlet opening is located right below the air outlet side of the fan.

In one of the implementations, a cross-sectional area of the air inlet opening in a direction perpendicular to an air inlet direction is greater than a cross-sectional area of the air outlet opening in a direction perpendicular to an air outlet direction.

In one of the implementations, the blower vacuum includes a body at least partially covering the airflow generation apparatus, the body includes a holding portion to be held by an operator and a main unit housing connected to the holding portion, the main unit housing is provided with an opening in communication with the outside, in the blowing mode, the opening is in fluid communication with the air inlet portion, and the volute is rotatably mounted in the main unit housing by a rotational axis A.

In one of the implementations, the air outlet portion and the air inlet portion of the volute are disposed at 90 degrees from each other around the rotational axis A.

In one of the implementations, in the blowing mode, the motor body is located below the rotational axis A, and in the suction mode, the motor output shaft and the rotational axis A are approximately located at the same height.

In one of the implementations, the blower vacuum includes a collection apparatus detachably connected to the air outlet portion and used for collecting a foreign object flowing inside from the tube opening of the blowing-suction tube, and the collection apparatus is located below the body.

In one of the implementations, the airflow generation apparatus is an independent integral structure, and a blowing-suction switching mechanism operably drives the volute to rotate around the rotational axis A relative to the main unit housing, to drive the blower vacuum to be at a blowing position in the blowing mode or a suction position in the suction mode.

In one of the implementations, the blowing-suction switching mechanism includes a toggle, the blowing-suction tube includes a first end near the airflow generation apparatus, and the toggle operably drives the first end of the blowing-suction tube to move between a first position near the airflow generation apparatus and a second position away from the airflow generation apparatus.

In one of the implementations, the blowing-suction switching mechanism further includes an operation component pivotally mounted on the body, and when the blowing-suction tube is at the second position, the operation component operably drives the airflow generation apparatus to rotate to the blowing position or the suction position.

In one of the implementations, the blowing-suction tube is pivotally disposed around a rotational axis A' relative to the holding portion, and the blowing-suction tube is rotatable between the blowing position and the suction position.

To achieve the foregoing objective, the technical solution further adopted in the embodiments of the present disclosure is a blower vacuum, having a blowing mode and a suction mode, and including:

a body, including a holding portion to be held by an operator;

an airflow generation apparatus, connected to the body, and including a motor, a fan driven by the motor to generate an airflow, and a volute surrounding the fan, the volute including an air inlet portion and an air outlet portion in communication with the outside, the air inlet portion includes an air inlet opening capable of being in communication with the outside in the blowing mode, the air outlet portion includes an air outlet opening capable of guiding out a sucked foreign object by the airflow, the fan includes an air inlet side perpendicular to a motor output shaft and an air outlet side parallel to the motor output shaft, and in the blowing mode, an air inlet channel is formed from the air inlet opening to the air inlet side, and an air outlet channel is formed from the air outlet side to a tube opening; and a blowing-suction tube, having the tube opening in communication with the outside to admit or discharge air, and in the suction mode, a dust suction channel being formed from the tube opening to the air inlet side, and a dust discharge channel being formed from the air outlet side to the air outlet opening, where the volute is pivotally disposed relative to the blowing-suction tube, and the volute is at least rotatable between a blowing position in the blowing mode and a suction position in the suction mode, to enable the blower vacuum to switch between the blowing mode and the suction mode;

when the blower vacuum is in the blowing mode, an extending direction of the air inlet channel is configured to be consistent with an extending direction of the motor output shaft or to be offset clockwise or counterclockwise from an extending direction of the motor output shaft by an angle within a range of 20 degrees;

an extending direction of the air outlet channel is configured to be consistent with the extending direction of the motor output shaft or to be offset clockwise or counterclockwise from the extending direction of the motor output shaft by an angle within a range of 20 degrees;

when the blower vacuum is in the suction mode, an extending direction of the dust suction channel is configured to be basically consistent with the extending direction of the motor output shaft or to be offset clockwise or counterclockwise from the extending direction of the motor output shaft by an angle within a range of 20 degrees; and an extending direction of the dust discharge channel is configured to be perpendicular to the extending direction of the motor output shaft or to be offset clockwise or counterclockwise from a direction perpendicular to the extending direction of the motor output shaft by an angle within a range of 20 degrees.

In one of the implementations, when the blower vacuum is in the blowing mode, the extending direction of the air inlet channel is capable of being configured to be consistent with the extending direction of the motor output shaft, and the extending direction of the air outlet channel is configured to be consistent with the direction perpendicular to the extending direction of the motor output shaft or to be offset counterclockwise or clockwise from the direction perpendicular to the extending direction of the motor output shaft by an angle within a range of 20 degrees.

In one of the implementations, when the blower vacuum is in the blowing mode, the extending direction of the air inlet channel is capable of being configured to be offset clockwise from the extending direction of the motor output shaft by an angle within a range of 20 degrees, and the extending direction of the air outlet channel is configured to be consistent with the direction perpendicular to the extending direction of the motor output shaft or to be offset counterclockwise from the direction perpendicular to the extending direction of the motor output shaft by an angle within a range of 20 degrees.

In one of the implementations, when the blower vacuum is in the blowing mode, the extending direction of the air inlet channel is capable of being configured to be offset counterclockwise from the extending direction of the motor output shaft by an angle within a range of 20 degrees, and the extending direction of the air outlet channel is configured to be consistent with the direction perpendicular to the extending direction of the motor output shaft or to be offset clockwise or counterclockwise from the direction perpendicular to the extending direction of the motor output shaft by an angle within a range of 20 degrees.

In one of the implementations, when the blower vacuum is in the suction mode, the extending direction of the dust suction channel is configured to be basically consistent with the extending direction of the motor output shaft, and the extending direction of the dust discharge channel is configured to be consistent with the direction perpendicular to the extending direction of the motor output shaft or to be offset clockwise or counterclockwise from the direction perpendicular to the extending direction of the motor output shaft by an angle within a range of 20 degrees.

In one of the implementations, when the blower vacuum is in the suction mode, the extending direction of the dust suction channel is configured to be offset clockwise from the extending direction of the motor output shaft by an angle within a range of 20 degrees, and the extending direction of the dust discharge channel is configured to be consistent with the direction perpendicular to the extending direction of the motor output shaft or to be offset clockwise from the direction perpendicular to the extending direction of the motor output shaft by an angle within a range of 20 degrees.

In one of the implementations, when the blower vacuum is in the suction mode, the extending direction of the dust suction channel is configured to be offset counterclockwise from the extending direction of the motor output shaft by an angle within a range of 20 degrees, and the extending direction of the dust discharge channel is configured to be consistent with the direction perpendicular to the extending direction of the motor output shaft or to be offset clockwise or counterclockwise from the direction perpendicular to the extending direction of the motor output shaft by an angle within a range of 20 degrees.

Another objective of the present invention is to provide a single-tube blower vacuum, so that clogging in a suction mode by a foreign object can be effectively reduced.

To achieve the foregoing objective, the technical solution further adopted in the embodiments of the present disclosure is a blower vacuum, having a blowing mode and a suction mode, and including:

a body, including a holding portion to be held by an operator and a main unit housing connected to the holding portion, the main unit housing being provided with an opening in communication with the outside;

an airflow generation apparatus, the main unit housing at least partially covering the airflow generation apparatus, the airflow generation apparatus including a motor, a fan driven by the motor and generating an airflow, and a volute surrounding the fan, the motor including a motor body and a motor output shaft extending from the motor body, the volute including an air inlet portion and an air outlet portion that are in communication; and a blowing-suction tube, having a tube opening in communication with the outside to admit or discharge air, where the blowing-suction tube is a single-cavity air tube, the fan is a centrifugal fan, the volute accommodating the centrifugal fan is capable of being pivotally disposed relative to the main unit housing, and the volute is at least rotatable between a blowing position in the blowing mode and a suction position in the suction mode;

in the blowing mode, an angle formed between an extending direction of the air inlet portion and an extending direction of the blowing-suction tube is a first angle; and in the suction mode, an angle formed between an extending direction of the air outlet portion and the extending direction of the blowing-suction tube is a second angle, and the first angle is equal to the second angle.

In one of the implementations, the centrifugal fan includes an air inlet side perpendicular to the motor output shaft and an air outlet side parallel to the motor output shaft, in the blowing mode, the tube opening is located right in front of the air outlet side, and in the suction mode, the tube opening is located right in front of the air inlet side.

In one of the implementations, the airflow generation apparatus is an independent integral structure, and the independent integral structure is rotatably mounted on the main unit housing.

In one of the implementations, the blower vacuum includes a collection apparatus detachably connected to the air outlet portion, and the collection apparatus is located right below the body.

In one of the implementations, the air inlet portion includes an air inlet opening in communication with the opening in the blowing mode, the air outlet portion includes an air outlet opening capable of being connected to the collection apparatus in the suction mode, and the air outlet opening and the air inlet opening of the volute are located at 90 degrees from each other around a rotational axis A.

In one of the implementations, in the blowing mode, the motor body is located below the centrifugal fan, and in the suction mode, the motor output shaft and the rotational axis A are approximately located at the same height.

In one of the implementations, a cross-sectional area of the tube opening in a direction perpendicular to an air inlet direction is greater than a cross-sectional area of the air outlet opening in a direction perpendicular to an air outlet direction.

To achieve the foregoing objective, the technical solution further adopted in the embodiments of the present disclosure is a blower vacuum, having a blowing mode and a suction mode, and including:

a body, including a holding portion and a main unit housing connected to the holding portion, the main unit housing being provided with an opening in communication with the outside;

an airflow generation apparatus, connected to the main unit housing, the airflow generation apparatus including a motor, a fan driven by the motor and generating an airflow, and a volute surrounding the fan, the motor including a motor body and a motor output shaft extending from the motor body, the volute including an air inlet portion and an air outlet portion that are in communication; and a blowing-suction tube, having a tube opening in communication with the outside to admit or discharge air, where the blowing-suction tube is a single-cavity air tube, the fan is a centrifugal fan, the volute accommodating the centrifugal fan is capable of being pivotally disposed relative to the holding portion, and the volute is at least rotatable between a blowing position in the blowing mode and a suction position in the suction mode;

in the blowing mode, an angle formed between an extending direction of the air inlet portion and an extending direction of the blowing-suction tube is a first angle; and in the suction mode, an angle formed between an extending direction of the air outlet portion and the extending direction of the blowing-suction tube is a second angle, and the first angle is equal to the second angle.

In one of the implementations, the first angle is 90 degrees.

In one of the implementations, in the suction mode, the motor body, the centrifugal fan, and the blowing-suction tube are sequentially arranged in an axial direction.

Another objective of the present invention is to provide a single-tube blower vacuum, so that both the blowing efficiency and suction efficiency can be ensured.

To achieve the foregoing objective, the technical solution further adopted in the embodiments of the present disclosure is a blower vacuum, having a blowing mode and a suction mode, and including:

an airflow generation apparatus, including a motor, a fan driven by an output shaft of the motor and generating an airflow, and a volute surrounding the fan, the volute including an air inlet portion and an air outlet portion in communication;

a blowing-suction tube, connected to a main unit housing, and having a tube opening in communication with the outside to admit or discharge air, where the air inlet portion includes an air inlet opening in communication with the outside in the blowing mode, and the air outlet portion includes an air outlet opening allowing a sucked foreign object to flow outside; and the fan is a centrifugal fan, the blowing-suction tube is a single-cavity air tube, the blowing-suction tube is provided at a first end near the airflow generation apparatus, the volute and the blowing-suction tube operably move relative to each other, to enable the blower vacuum to switch between the blowing mode and the suction mode, and in the blowing mode, there is a gap between the air outlet opening and the first end to allow an external airflow to enter the blowing-suction tube through the gap.

In one of the implementations, the blower vacuum includes a body disposed around the airflow generation apparatus, the body includes a holding portion and the main unit housing connected to the holding portion, the body is provided with an opening in communication with the outside, and in the blowing mode, the opening is in fluid communication with the air inlet portion.

In one of the implementations, the airflow generation apparatus is an independent integral structure, the independent integral structure is pivotally disposed relative to the main unit housing and is rotatable between a blowing position in the blowing mode and a suction position in the suction mode, when the airflow generation apparatus rotates to the blowing position, an airflow flows into the volute from the air inlet portion and flows into the blowing-suction tube from the air outlet portion of the airflow generation apparatus, and when the volute rotates to the suction position, an airflow enters an inner cavity of the volute from the tube opening and flows out from the air outlet portion.

In one of the implementations, the first end of the blowing-suction tube and the air outlet portion at least partially overlap in an axial direction.

In one of the implementations, a ratio of a cross-sectional area of the air outlet opening in a direction perpendicular to an air outlet direction to a cross-sectional area of the first end in the direction perpendicular to the air outlet direction is greater than or equal to 1.5 and is less than or equal to 6.

In one of the implementations, the blowing-suction tube has a sectional form and includes a first sub-blowing-suction tube away from the airflow generation apparatus and a second sub-blowing-suction tube near the airflow generation apparatus, and an end, near the airflow generation apparatus, of the second sub-blowing-suction tube forms the first end of the blowing-suction tube.

In one of the implementations, the second sub-blowing-suction tube operably displaces in the axial direction relative to the first sub-blowing-suction tube, the second sub-blowing-suction tube has a first position near the airflow generation apparatus and a second position away from the airflow generation apparatus, and when the second sub-blowing-suction tube is at the second position, the airflow generation apparatus is capable of freely switching between the blowing mode and the suction mode.

In one of the implementations, the blower vacuum further includes a blowing-suction switching mechanism operably driving the airflow generation apparatus to pivot around a rotational axis A relative to the main unit housing.

In one of the implementations, the blowing-suction switching mechanism includes a toggle controlling the second sub-blowing-suction tube to move toward the first position or controlling the second sub-blowing-suction tube to move toward the second position, and the toggle is pivotally connected to the blowing-suction tube.

In one of the implementations, the blowing-suction switching mechanism further includes an operation component pivotally mounted on the body, and when the second sub-blowing-suction tube is at the second position, the operation component operably drives the airflow generation apparatus to be in the blowing position or the suction position.

Still another objective of the present invention is to provide a single-tube blower vacuum that is convenient to operate and has improved comfort of human-machine interaction.

To achieve the foregoing objective, the technical solution adopted in the embodiments of the present disclosure is a blower vacuum, having a blowing mode and a suction mode, and including:

- a body, including a holding portion and a main unit housing connected to the holding portion, the main unit housing being provided with an opening in communication with the outside;
- an airflow generation apparatus, connected to the main unit housing, and including a motor, a fan driven by an output shaft of the motor and generating an airflow, and a volute surrounding the fan, the volute including an air inlet portion and an air outlet portion in communication;
- a blowing-suction tube, having a tube opening in communication with the outside to admit or discharge air, where
- the air inlet portion includes an air inlet opening in fluid communication with the opening in the blowing mode, and the air outlet portion includes an air outlet opening allowing a sucked foreign object to flow outside; and
- the blowing-suction tube is a single-cavity air tube and is provided with a first end near the volute, the blower vacuum further includes a blowing-suction switching mechanism, the blowing-suction switching mechanism is a linkage apparatus, the linkage apparatus is capable of driving the first end of the blowing-suction tube to be away from the air inlet portion or the air outlet portion of the volute by a preset distance and is capable of linking the volute to rotate relative to the main unit housing to a blowing position in the blowing mode or to a suction position in the suction mode, when the volute rotates from the blowing position to the suction position, the linkage apparatus is capable of linking the first end of the blowing-suction tube to face the air inlet portion, and when the volute switches from the suction mode to the blowing mode, the linkage apparatus is capable of linking the first end of the blowing-suction tube to face the air outlet portion.

In one of the implementations, the linkage apparatus drives the blowing-suction tube to make an axial movement relative to the volute to enable the first end of the blowing-suction tube to be away from the air inlet portion of the volute or the air outlet portion of the volute by the preset distance.

In one of the implementations, when the linkage apparatus links the volute to move relative to the main unit housing to the blowing position, the linkage apparatus is capable of continuing to operate and drive the first end of the blowing-suction tube to displace toward the air outlet portion of the volute by the preset distance.

In one of the implementations, when the linkage apparatus links the volute to move relative to the main unit housing to the suction position, the linkage apparatus is capable of continuing to operate and drive the first end of the blowing-suction tube to displace toward the air inlet portion of the volute by the preset distance, and the first end of the blowing-suction tube is connected to the air inlet portion of the volute in a sealed manner.

In one of the implementations, the airflow generation apparatus is an independent integral structure, and the linkage apparatus is capable of driving the independent integral structure to be rotatable relative to the main unit housing.

In one of the implementations, the linkage apparatus includes a connecting rod, a rotary disk pivotally mounted on the body, and a linkage member fixedly connected to the airflow generation apparatus, the rotary disk is further provided with a convex rod capable of being joined to the linkage member to drive the linkage member to rotate, one end of the connecting rod is pivotally connected to the first end of the blowing-suction tube, and the other end of the connecting rod is pivotally connected to the rotary disk; and

- the connecting rod and the rotary disk form a crank connecting rod mechanism to convert the rotation of the rotary disk into the axial movement of the blowing-suction tube, and the rotary disk, the convex rod, and the linkage member form a Geneva mechanism, to convert continuous rotation of the rotary disk into intermittent rotation of the airflow generation apparatus relative to the main unit housing through a joint between the connecting rod and the linkage member.

In one of the implementations, the linkage apparatus links the airflow generation apparatus to switch from the blowing mode to the suction mode or from the suction mode to the blowing mode, and a rotational angle of the rotary disk is greater than an angle by which the linkage member links the airflow generation apparatus to rotate.

In one of the implementations, the linkage member includes a first sliding surface and a second sliding surface matching an outer circumferential surface of the rotary disk and an opening groove provided between the first sliding surface and the second sliding surface, when the blower vacuum is in the blowing mode, the outer circumferential surface of the rotary disk faces the first sliding surface, and when the airflow generation apparatus switches to the suction mode, the outer circumferential surface of the rotary disk faces the second sliding surface.

In one of the implementations, the rotary disk rotates and drives the convex rod to switch from being joined to the opening groove to being disengaged from the opening groove, when the first sliding surface of the linkage member slides relative to the outer circumferential surface of the rotary disk, the convex rod is disengaged from the opening groove, the convex rod is joined to the opening groove, and the rotary disk drives the linkage member to rotate circumferentially.

In one of the implementations, when the convex rod is disengaged from the opening groove, the rotary disk is capable of continuing to rotate by the preset distance, and one end of the connecting rod drives the blowing-suction tube to move toward the airflow generation apparatus.

In one of the implementations, the rotary disk includes an anti-rotation plug at least partially protruding from the body, the linkage apparatus further includes an operation component adaptively connected to the anti-rotation plug, and the operation component drives the rotary disk to rotate circumferentially.

In one of the implementations, the operation component includes a hand wheel provided with a concave accommodating cavity and a base accommodated in the accommodating cavity and protruding toward the airflow generation apparatus, the base is provided with an anti-rotation socket matching the anti-rotation plug, the anti-rotation plug is a flat rectangular structure, and the anti-rotation socket is a flat rectangular slot.

In one of the implementations, the linkage apparatus further includes a locking mechanism capable of limiting the airflow generation apparatus at the blowing position or limiting the airflow generation apparatus at the suction position, and the locking mechanism is disposed between the operation component and the main unit housing.

In one of the implementations, the locking mechanism includes a locking member provided with a locking pin, the main unit housing is provided with a slot capable of being locked to the locking pin to lock the blower vacuum in a corresponding working mode, and the operation component operably drives the locking pin to be disengaged from or locked to the slot, to implement switching of the blower vacuum between the blowing mode and the restoring mode.

In one of the implementations, the locking mechanism further includes an elastic member disposed between the locking member and the operation component, and the elastic member is capable of applying a restoring force for locking the locking mechanism and the slot.

In one of the implementations, the locking member includes a base portion and a fitting portion disposed on the base portion, the locking pin is located at a free end of the base portion, the operation component is further provided with an action portion capable of fitting the fitting portion, and the action portion is capable of pushing the fitting portion to drive the locking pin to be disengaged from the slot.

In one of the implementations, the operation component includes an exposed pressing portion for pressing, the action portion and the exposed pressing portion are integrally formed, at the same time when an external force is applied to the exposed pressing portion, and the action portion is capable of displacing relative to the main unit housing and pushing the fitting portion, to disengage the slot from the locking pin.

In one of the implementations, a movement direction of the action portion relative to the main unit housing is opposite a movement direction of the fitting portion relative to the main unit housing.

In one of the implementations, an end, facing the action portion, of the fitting portion is formed with an action surface, and the action surface is an inclined slope.

In one of the implementations, as the linkage apparatus drives the volute to rotate, the motor is capable of being in a state of driving the fan to rotate.

Yet another objective of the present invention is to provide a single-tube blower vacuum, so that switching between blowing and suction is convenient and a main unit housing has a small volume.

To achieve the foregoing objective, the technical solution adopted in the embodiments of the present disclosure is a blower vacuum, having a blowing mode and a suction mode, and including:

a body, including a holding portion and a main unit housing connected to the holding portion, the main unit housing being provided with an opening in communication with the outside;

an airflow generation apparatus, connected to the main unit housing, and including a motor, a fan driven by an output shaft of the motor and generating an airflow, and a volute surrounding the fan, the volute including an air inlet portion and an air outlet portion in communication, the fan including a hub and several blades arranged in a circumferential direction of the hub; and a blowing-suction tube, connected to the body, and having a tube opening in communication with the outside to admit or discharge air, the blowing-suction tube being provided at a first end near the airflow generation apparatus, where the main unit housing at least partially covers the volute, the volute is pivotally disposed relative to the main unit housing and is at least rotatable between a blowing position in the blowing mode and a suction position in the suction mode, the largest distance between a rotational center of the fan and an inner wall of the volute is L1, a distance between the rotational center of the fan and an edge of a blade is L2, and a ratio of the distance L1 to the distance L2 is greater than or equal to 1.2 and is less than or equal to 2.

In one of the implementations, the ratio of the distance L1 to the distance L2 is greater than or equal to 1.8 and is less than or equal to 2.

In one of the implementations, in an extending direction of a rotational axis of the fan, the largest distance between two opposite inner walls of the volute is W1, the height of the fan is W2, and a ratio of the largest distance W1 to the height W2 is greater than 1.

In one of the implementations, the volute includes a spiral portion, a throat portion, and a volute tongue formed between a starting end of the spiral portion and the throat portion, and a ratio of the smallest distance between the volute tongue and the edge of the blade close to the volute tongue to the diameter of the fan is 0.08 to 0.12.

In one of the implementations, the ratio of the smallest distance between the volute tongue and the edge of the blade close to the volute tongue to the largest distance L1 between the rotational center of the fan and the inner wall of the volute is greater than or equal to 0.06.

In one of the implementations, the fan is a centrifugal fan.

In one of the implementations, the air outlet portion includes an air outlet opening allowing a sucked foreign object to flow outside, and in the blowing mode, there is a gap for an external airflow to enter the blowing-suction tube between the air outlet opening and the first end.

In one of the implementations, a ratio of a cross-sectional area of the air outlet opening in a direction perpendicular to an air outlet direction to a cross-sectional area of the first end in the direction perpendicular to the air outlet direction is greater than or equal to 1.5 and is less than or equal to 6.

In one of the implementations, a ratio of a cross-sectional area of the air outlet opening in a direction perpendicular to an air outlet direction to a cross-sectional area of the first end in the direction perpendicular to the air outlet direction is greater than or equal to 3 and is less than or equal to 5.

In the single-tube blower vacuum of the present invention, one tube is used for both blowing and suction. It is not necessary to detach and change a blowing tube and a suction tube to switch between blowing and suction. It is only necessary to rotate the airflow generation apparatus relative to the body by a particular angle to implement switching between blowing and suction. The human-machine interaction is desirable, so that the use comfort of a user is improved, and the use efficiency of the user is improved.

DETAILED DESCRIPTION

Exemplary implementations of the present invention are described below in detail with reference to the accompanying drawings. It should be understood that these specific descriptions are merely used for teaching a person skilled in the art to implement the present invention, but are not used to exhaust all possible manners of the present invention and are not used for limiting the scope of the present invention.

First Implementation

An overall structure of a single-tube blower vacuum according to the first implementation of the present invention is first described.

Figure 1A:
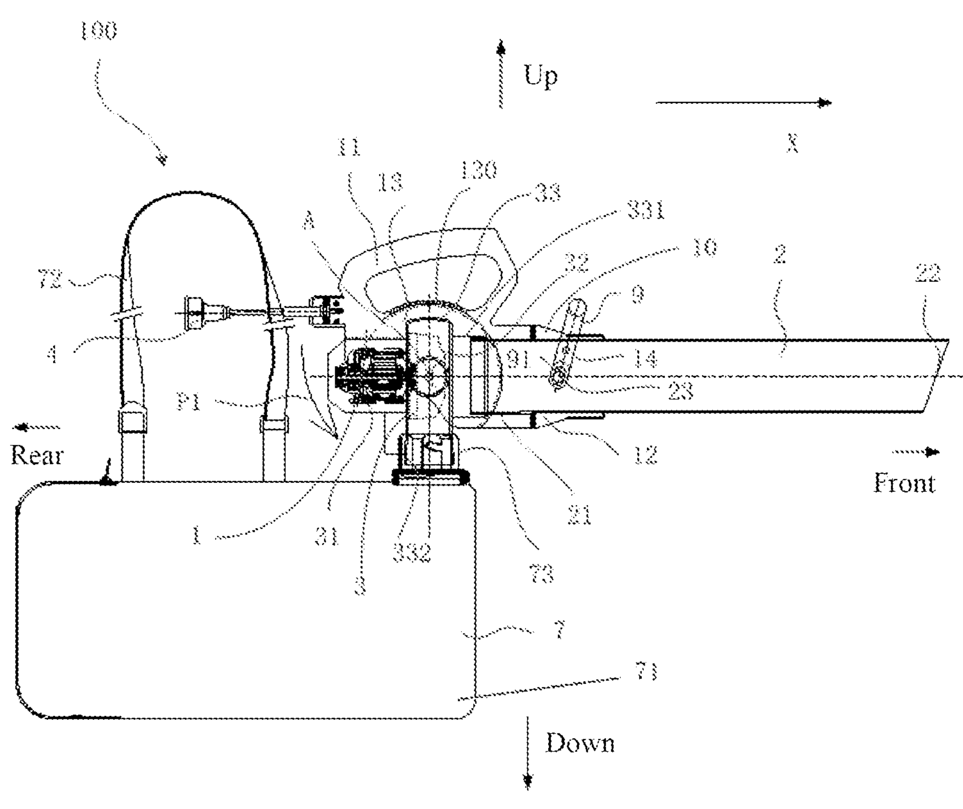
FIG. 1A shows a single-tube blower vacuum according to the present invention, the single-tube blower vacuum being in a suction mode.
Figure 1B:
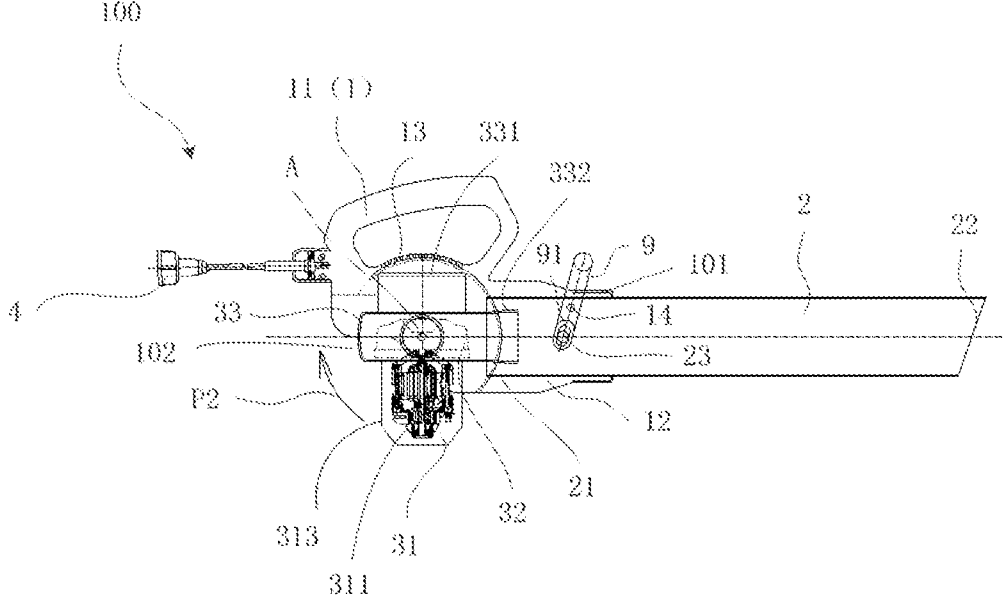
FIG. 1B shows a single-tube blower vacuum according to the present invention, the single-tube blower vacuum being in a blowing mode.

As shown in FIG. 1A and FIG. 1B, the first implementation of the present invention provides a single-tube blower vacuum (sometimes referred to as a "blower vacuum" for short) 100 for cleaning fallen leaves and twig pieces in a garden, including a body 1, a blowing-suction tube 2, and an airflow generation apparatus 3. Specifically, the blower vacuum 100 may use a blowing function to gather scattered leaves or may use a suction function to suck leaves into a specified garbage collection apparatus to implement cleaning.

Therefore, the blower vacuum 100 has the following two working modes. When the blower vacuum 100 is in a first working mode, the blower vacuum 1 performs the blowing function, and when the blower vacuum 100 is in a second working mode, the blower vacuum 1 performs the suction function. Therefore, the first working mode may also be referred to as a blowing mode (referring to FIG. 1B), and the second working mode may also be referred to as a suction mode (referring to FIG. 1A). The blower vacuum 100 may selectively work in the blowing mode or the suction mode according to an actual requirement of a user.

Figure 9:
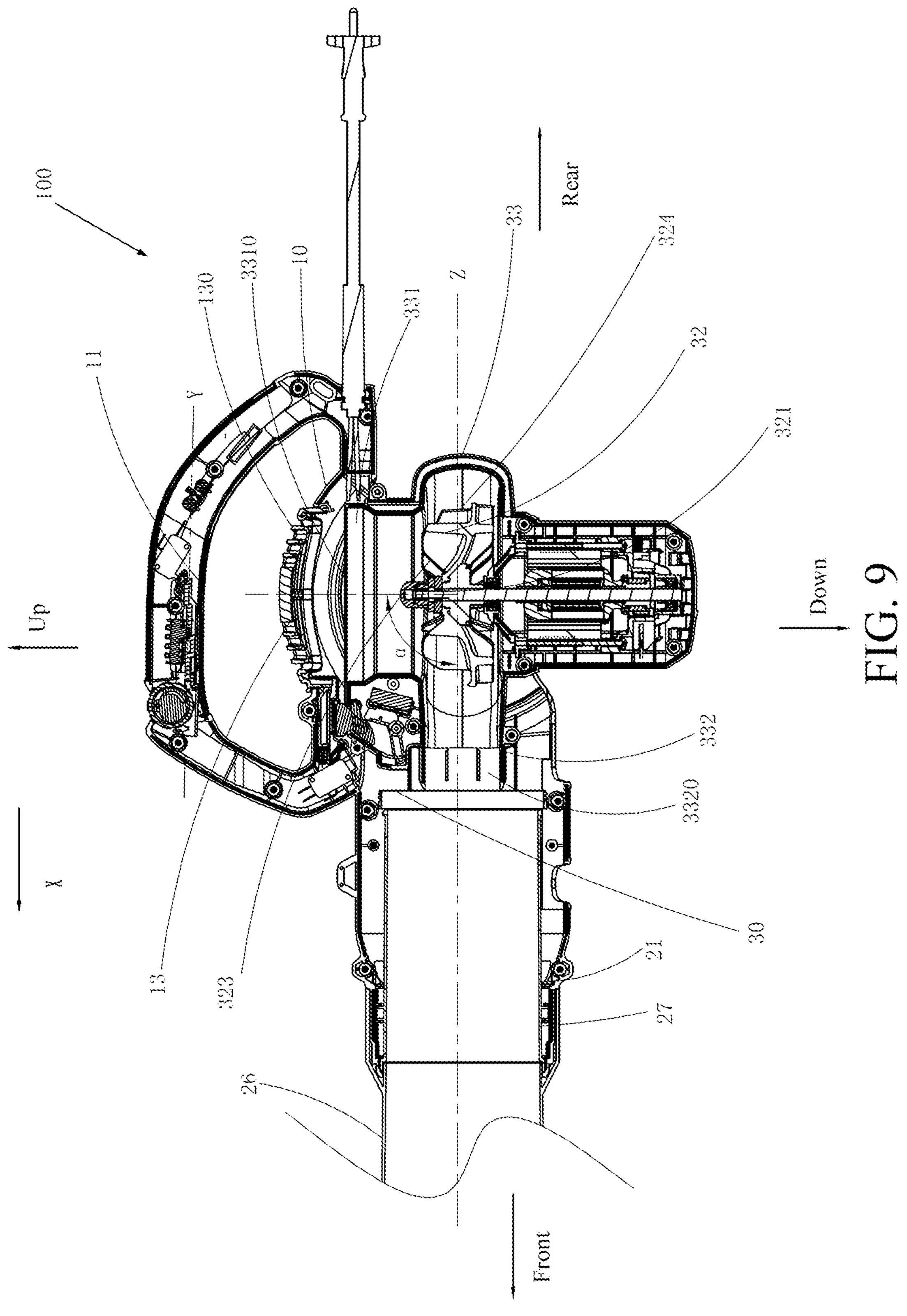
FIG. 9 is a sectional view of a partial structure of a blower vacuum in a blowing mode according to a first implementation of the present invention.
Figure 17:
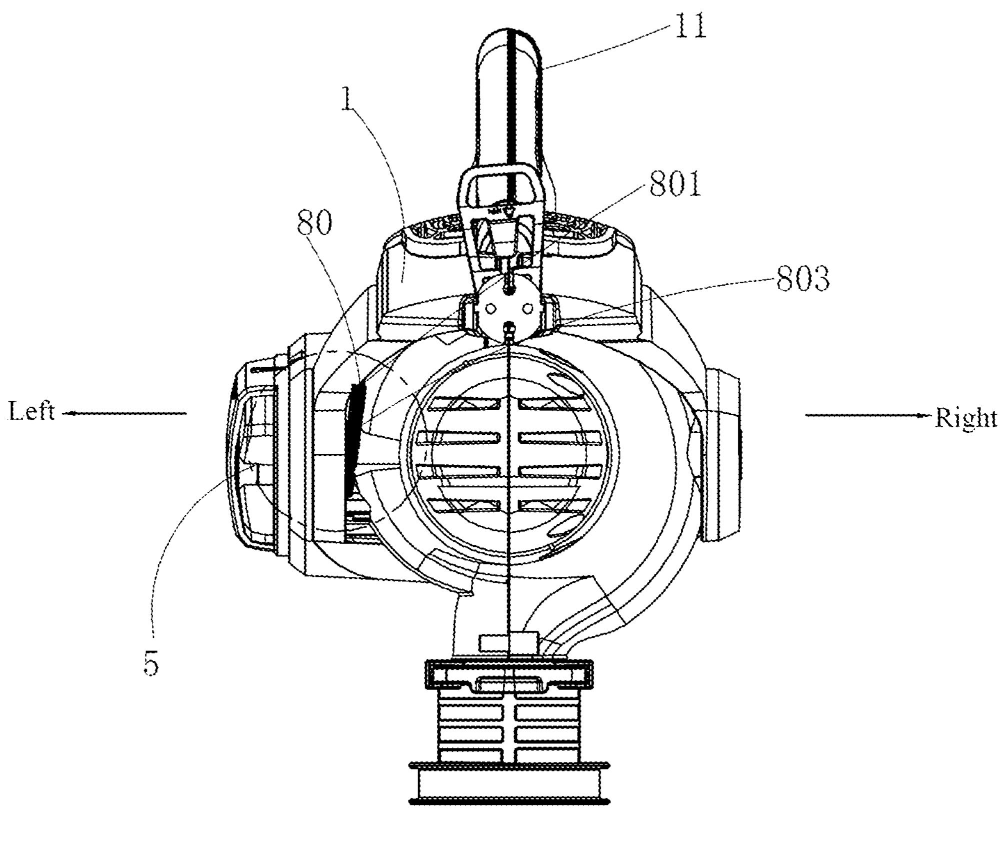
FIG. 17 is a rear view of a blower vacuum in a blowing mode according to a third implementation of the present invention.

The blower vacuum 100 generally extends in a direction shown by an arrow X in FIG. 1A and FIG. 9. The direction is defined as an axial direction. Further, in the present invention, for ease of understanding, as shown in FIG. 1A and FIG. 9, in the axial direction, a side, away from the airflow generation apparatus 3, of the blowing-suction tube 2 is defined as front, the opposite side is defined as rear, the above in the drawings is defined as above, and the below in the drawings is defined as below. Reference may be made to FIG. 17 for the left side and the right side, and the foregoing definitions are only used for description, and should not be understood as a limitation to the present invention.

As shown in FIG. 1 to FIG. 4 and FIG. 9 to FIG. 11, the body 1 includes a holding portion (handle) 11 and a main unit housing 10 connected to the holding portion 11. The holding portion 11 and the main unit housing 10 may be integrally disposed, and certainly may be separately disposed. The main unit housing 10 is provided with a blowing-suction tube connecting portion 12 and a body air inlet portion 13. In the example shown in the figures, the body air inlet portion 13 is near the holding portion 11, and the body air inlet portion 13 includes an opening 130 in communication with the outside. A first end 21 of the blowing-suction tube 2 is mounted at the blowing-suction tube connecting portion 12, and a second end of the blowing-suction tube 2 is opposite the first end 21 in the axial direction and is formed with a tube opening 22 for admitting and discharging air. As shown in FIG. 1A and FIG. 1B, the tube opening 22 preferably tilts relative to an extending direction (a central axis) of the blowing-suction tube 2. That is, a plane in which the tube opening 22 is located is not perpendicular to the extending direction of the blowing-suction tube 2. In the example shown in the figures, the blowing-suction tube 2 is a straight tube. However, the present invention is not limited thereto. One or more positions of the blowing-suction tube 2 may have a particular radian.

Referring to FIG. 1A and FIG. 1B, FIG. 2A and FIG. 2B, and FIG. 9 to FIG. 11, the airflow generation apparatus 3 is at least partially exposed on an outer side of the body 1. Specifically, the main unit housing 10 is provided with a front-end opening 101 and a rear-end opening 102 penetrating in a longitudinal direction. The airflow generation apparatus 3 at least partially extends backward and is exposed from an outer side of the rear-end opening 102. The airflow generation apparatus 3 includes a motor 31, a fan 32 connected to the motor 31, and a volute 33 surrounding the fan 32. The motor 31 includes a motor body 311 and a motor output shaft 312 extending from the motor body 311. A rotational axis of the motor output shaft 312 basically coincides with a rotational axis of the fan 32. In an implementation, the volute 33 may be fixedly connected to or integrally formed with a motor cylinder (a motor housing 313 covering the motor 31) of the motor 31, so that the entire airflow generation apparatus 3 is an independent integral structure. Certainly, the volute and the motor housing 313 may be separately disposed. The volute 33 includes an air inlet portion (an air inlet tube) 331 and an air outlet portion (an air outlet tube) 332 in communication with the outside. The air inlet portion 331 includes an air inlet opening 3310 capable of being in fluid communication with the opening 130 in the blowing mode, and the air inlet opening 3310 is disposed facing the holding portion 11. Preferably, the opening 130 is located right above the air inlet opening 3310, so that an airflow directly enters the air inlet portion 331 without turning. The air outlet portion 332 includes an air outlet opening 3320 capable of being connected to the collection apparatus in the suction mode. A foreign object sucked into the blowing-suction tube 2 can pass through the fan 32, and flows into the collection apparatus through the air outlet opening 3320. It should be noted that "fluid communication" should be understood as that gas can flow between two openings.

Figure 10:
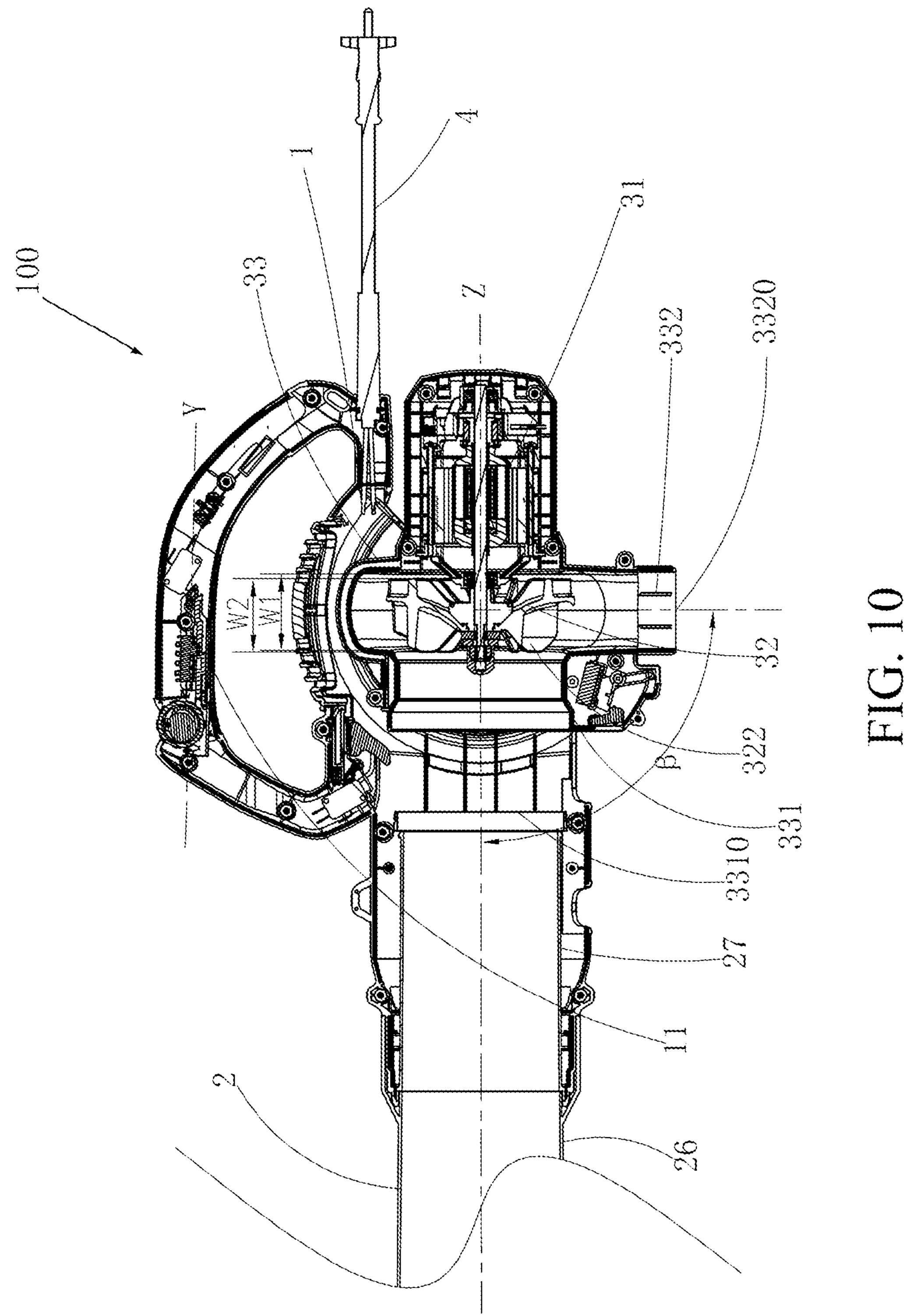
FIG. 10 is a partial sectional view after a linkage apparatus in the first implementation of the present invention driving an airflow generation apparatus to rotate by 90 degrees.

As shown in FIG. 9 and FIG. 10, the fan 32 may be a double-layer vane structure. A main blade is disposed on one side of a hub of the fan, and an auxiliary blade is disposed on the other side of the hub of the fan. The auxiliary blade is mainly used for cooling the motor, and the main blade is mainly used for implementing the blowing function. Specifically, in this implementation, as shown in FIG. 9 and FIG. 10, the fan 32 used in the single-tube blower vacuum 100 provided in the present invention is a centrifugal fan. The fan 32 includes a hub 321 and several blades 322 disposed circumferentially around the hub 321. When the centrifugal fan 32 is driven by the motor 31 to rotate, gas filled between the blades of the centrifugal fan 3 is pushed by the blades 322 and is thrown to outer edges of the blades under the effect of a centrifugal force. After the pressure energy and kinetic energy of the gas are increased, gas flows out from the outer edges of the blades 322, and a negative pressure is formed in the middle of the blades 322, so that gas is continuously sucked in and discharged to generate an axial suction force and a longitudinal blowing force. Particularly, when the blower vacuum 100 is in the suction mode, and when a housing part around the centrifugal fan 32 is clogged by miscellaneous objects such as leaves, in this case, the centrifugal fan 32 may generate a larger output suction force, making it easy to suck out and discharge clogged leaves. Referring to FIG. 9 and FIG. 10, the centrifugal fan 32 has an air inlet side 323 perpendicular to the motor output shaft 312 and an air outlet side 324 parallel to the motor output shaft 312. In the blowing mode, an air inlet channel Q1 is formed from the air inlet opening 3310 to the air inlet side 323, and an air outlet channel Q2 is formed from the air outlet side 324 to the tube opening 22. In the suction mode, a dust suction channel Q3 is formed from the tube opening 22 to the air inlet side 323, and a dust discharge channel Q4 is formed from the air outlet side 324 to the air outlet opening 3320.

In the present invention, the volute 33 and the blowing-suction tube 2 operably move relative to each other, to enable the blower vacuum 100 to switch between the blowing mode and the suction mode. In a feasible implementation, the air inlet channel Q1 and the dust suction channel Q3 may be designed to be offset clockwise or counterclockwise from the motor output shaft 312 by a particular preset angle. The air outlet channel Q2 and the dust discharge channel Q4 may be designed to be offset clockwise or counterclockwise from a direction perpendicular to the motor output shaft 312 by a particular preset angle. Specifically, when the blower vacuum 100 is in the blowing mode, an extending direction of the air inlet channel Q1 is configured to be consistent with an extending direction of the motor output shaft 312 or to be offset clockwise or counterclockwise from the extending direction of the motor output shaft 312 by an angle within a range of 20 degrees, and an extending direction of the air outlet channel Q2 is configured to be perpendicular to the extending direction of the motor output shaft 312 or to be offset clockwise or counterclockwise from a direction perpendicular to the extending direction of the motor output shaft 312 by an angle within a range of 20 degrees. When the blower vacuum 100 is in the suction mode, an extending direction of the dust suction channel Q3 is configured to be basically consistent with the extending direction of the motor output shaft 312 or to be offset clockwise or counterclockwise from the extending direction of the motor output shaft 312 by an angle within a range of 20 degrees, and an extending direction of the dust discharge channel Q4 is configured to be perpendicular to the extending direction of the motor output shaft 312 or to be offset clockwise or counterclockwise from the direction perpendicular to the extending direction of the motor output shaft 312 by an angle within a range of 20 degrees.

Specifically, in some embodiments, when the blower vacuum 100 is in the blowing mode, the extending direction of the air inlet channel Q1 can be configured to be consistent with the extending direction of the motor output shaft 312. In addition, the extending direction of the air outlet channel Q2 may be configured to be consistent with the direction perpendicular to the extending direction of the motor output shaft 312 or to be offset counterclockwise from the direction perpendicular to the extending direction of the motor output shaft 312 by an angle within a range of 20 degrees or to be offset clockwise from the direction perpendicular to the extending direction of the motor output shaft 312 by an angle within a range of 20 degrees. Preferably, the extending direction of the air outlet channel Q2 is configured to be consistent with the direction perpendicular to the extending direction of the motor output shaft 312 or to be offset counterclockwise from the direction perpendicular to the extending direction of the motor output shaft 312 by an angle within a range of 10 degrees or to be offset clockwise from the direction perpendicular to the extending direction of the motor output shaft 312 by an angle within a range of 10 degrees.

When the blower vacuum 100 is in the blowing mode, the extending direction of the air inlet channel Q1 can be configured to be offset counterclockwise from the extending direction of the motor output shaft 312 by an angle within a range of 20 degrees, and the extending direction of the air outlet channel Q2 is configured to be consistent with the direction perpendicular to the extending direction of the motor output shaft 312 or to be offset counterclockwise from the direction perpendicular to the extending direction of the motor output shaft 312 by an angle within a range of 20 degrees or to be offset clockwise from the direction perpendicular to the extending direction of the motor output shaft 312 by an angle within a range of 20 degrees.

When the blower vacuum 100 is in the blowing mode, the extending direction of the air inlet channel Q1 can be configured to be offset clockwise from the extending direction of the motor output shaft 312 by an angle within a range of 20 degrees, and the extending direction of the air outlet channel Q2 is configured to be consistent with the direction perpendicular to the extending direction of the motor output shaft 312 or to be offset clockwise from the direction perpendicular to the extending direction of the motor output shaft 312 by an angle within a range of 20 degrees.

When the blower vacuum 100 is in the suction mode, the extending direction of the dust suction channel Q3 is configured to be basically consistent with the extending direction of the motor output shaft 312, and the extending direction of the dust discharge channel Q4 is configured to be consistent with the direction perpendicular to the extending direction of the motor output shaft 312 or to be offset clockwise or counterclockwise from the direction perpendicular to the extending direction of the motor output shaft 312 by an angle within a range of 20 degrees.

When the blower vacuum 100 is in the suction mode, the extending direction of the dust suction channel Q3 is configured to be offset clockwise from the extending direction of the motor output shaft 312 by an angle within a range of 20 degrees, and the extending direction of the dust discharge channel Q4 is configured to be consistent with the direction perpendicular to the extending direction of the motor output shaft 312 or to be offset clockwise from the direction perpendicular to the extending direction of the motor output shaft 312 by an angle within a range of 20 degrees.

When the blower vacuum 100 is in the suction mode, the extending direction of the dust suction channel Q3 is configured to be offset counterclockwise from the extending direction of the motor output shaft 312 by an angle within a range of 20 degrees, and the extending direction of the dust discharge channel Q4 is configured to be consistent with the direction perpendicular to the extending direction of the motor output shaft 312 or to be offset counterclockwise or clockwise from the direction perpendicular to the extending direction of the motor output shaft 312 by an angle within a range of 20 degrees.

It can be easily understood that in the blowing mode, the extending direction of the air inlet channel Q1 is offset clockwise or counterclockwise from the extending direction of the motor output shaft 312 by an angle within a particular preset range, and the extending direction of the air outlet channel Q2 is offset clockwise or counterclockwise from the extending direction of the motor output shaft by an angle within a particular range. With such a configuration, in the blowing mode, the blowing efficiency can meet a requirement.

In the suction mode, the extending direction of the dust suction channel Q3 is offset clockwise or counterclockwise from the extending direction of the motor output shaft 312 by an angle within a preset range, and the extending direction of the dust discharge channel Q4 is offset clockwise or counterclockwise from the extending direction of the motor output shaft by an angle within a particular range. With such a configuration, in the suction mode, the suction efficiency can also meet a requirement.

Preferably, in the examples shown in FIG. 1A to FIG. 2B, FIG. 9, and FIG. 10, in the blowing mode, the extending direction of the motor output shaft 312 is consistent with an extending direction of the air inlet portion 331, and an extending direction of the air outlet portion 332 is perpendicular to the extending direction of the motor output shaft 312. In the suction mode, the extending direction of the motor output shaft 312 is consistent with the extending direction of the blowing-suction tube 2, and the extending direction of the air outlet portion 332 is perpendicular to the extending direction of the motor output shaft 312. Specifically, as shown in FIG. 1A to FIG. 2B, FIG. 9, and FIG. 10, in the blowing mode, the air inlet opening 3310 is located right above the air inlet side 323 of the fan 32, and the air outlet opening 3320 is located right in front of the air outlet side 324. An extending direction of the blowing-suction tube 2 is consistent with the extending direction of the air outlet portion 332. In the suction mode, the tube opening 22 is located right in front of the air inlet opening 3310, the air inlet opening 3310 is located right in front of the air inlet side 323, and the rotational axis of the motor output shaft 312, the rotational axis of the fan 32, and the central axis of the blowing-suction tube 2 basically coincide. The air outlet opening 3320 is located right below the air outlet side 324 of the fan 32. In this way, an airflow directly enters and leaves. In one aspect, in the blowing mode, an airflow loss caused by a bend is reduced, thereby improving a blowing effect. In another aspect, in the suction mode, clogging by a sucked object is reduced, thereby improving the suction efficiency.

For operable relative movement of the volute 33 and the blowing-suction tube 2, in a feasible implementation, as shown in FIG. 1A to FIG. 4D, FIG. 9, and FIG. 11, the volute 33 rotates to switch between blowing and suction. Specifically, the volute 33 is pivotally disposed relative to the holding portion 11 or the main unit housing 10, and is at least rotatable between a blowing position in the blowing mode and a suction position in the suction mode. When the volute 33 rotates to the blowing position (referring to FIG. 1B, FIG. 2B, FIG. 3B, and FIG. 9). An airflow passes through the opening 130 of the main unit housing 10 and enters the volute 33 through the air inlet portion 331, and flows into the blowing-suction tube 2 from the air outlet portion 332 of the volute 33. When the volute 33 rotates to the suction position (referring to FIG. 1A, FIG. 2A, FIG. 3A, and FIG. 10), an airflow enters the volute 33 from the tube opening 22 and flows out from the air outlet portion 332. An opening direction of the opening 130 of the air inlet portion 13 is disposed opposite an opening direction of the air outlet portion 332.

In this implementation, as shown in FIG. 9 and FIG. 10, the holding portion 11 extends longitudinally along a first axis Y, and the blowing-suction tube 2 extends longitudinally along a second axis Z. When the volute 33 rotates to switch between the blowing mode and the suction mode, an angle formed between the first axis Y and the second axis Z remains unchanged. It should be noted that when the first axis Y and the second axis Z are disposed to be parallel to each other, the angle is zero degrees. The blowing-suction tube 2 is a single-cavity air tube. When the blower vacuum 100 is in the blowing mode or the suction mode, the extending direction of the blowing-suction tube 2 remains unchanged. With such a design, in the blowing mode and the suction mode, only the volute 33 rotates, and a mounting direction of the blowing-suction tube 2 does not change. In other words, an angle between the blowing-suction tube 2 and the body 1/the holding portion 11 does not change. During switching between blowing and suction, it is only necessary to rotate the volute 33, and postures or directions of the body 1 (the holding portion 11) and the blowing-suction tube 2 are kept unchanged. An operator does not need to adjust a holding manner, and the blower vacuum 100 remains in the form of single-handed operation. This simplifies the operation during switching between blowing and suction, so that the design difficulty in the aspect of human-machine interaction of the blower vacuum is reduced, making it convenient for the operator to hold the machine for cleaning.

Further, when the volute 33 rotates to the blowing position, the air outlet opening 3320 faces the first end of the blowing-suction tube 2, and an angle formed between the extending direction of the air inlet portion 331 and the extending direction of the blowing-suction tube 2 is a first angle α (as shown in FIG. 9). Further, when the volute 33 rotates to the suction position, the air inlet opening 3310 is joined to and in communication with the first end of the blowing-suction tube 2, and the angle formed between the extending direction of the air outlet portion 332 and the extending direction of the blowing-suction tube 2 is a second angle β (as shown in FIG. 10). The "the air outlet opening 3320 faces the first end of the blowing-suction tube 2" may be understood as that a fully sealed connection or a non-fully sealed connection may be designed between the air outlet opening 3320 and the blowing-suction tube 2. The first angle α is equal to the second angle β. The first angle α and the second angle β may be 70 degrees to 110 degrees. Preferably, the first angle α and the second angle β may both be 90 degrees. It is easily understood that the air outlet portion 332 and the air inlet portion 331 are disposed around a rotational axis A at 70 degrees to 110 degrees from each other. Alternatively, the air outlet opening 3320 and the air inlet opening 3310 are disposed around the rotational axis A at 70 degrees to 110 degrees from each other, and preferably at an angle of 90 degrees from each other.

Further, it is easily understood that referring to the blower vacuum 100 in the figure, an angle between an extending direction X1 of the motor output shaft 312 in the blowing mode and an extending direction X2 of the motor output shaft 312 in the suction mode is 70 degrees to 110 degrees. Preferably, the angle is 90 degrees, and the volute 33 rotates counterclockwise or clockwise around the rotational axis A by 70 degrees to 110 degrees relative to the main unit housing 10, so that the blower vacuum 100 is in the blowing mode or the suction mode. Preferably, a rotational angle of the volute 33 is 90 degrees.

In the embodiments of the present disclosure, the blower vacuum 100 uses the same blowing-suction tube 2 in the blowing mode and the suction mode. Therefore, it is not difficult to understand that in the blower vacuum 100 in the embodiments of the present disclosure, an air opening through which an airflow flows out in the blowing mode and an air opening through which an airflow enters carrying a foreign object (such as leaves or twigs) in the suction mode are the same air opening, that is, the tube opening 22. To ensure that relatively large foreign objects such as leaves or twigs smoothly pass through the tube opening 22 to enter the blowing-suction tube 2. A cross-sectional area of the tube opening 22 in a direction perpendicular to an air inlet direction is not less than a cross-sectional area of the air outlet opening 3320 in a direction perpendicular to an air outlet direction. Preferably, the cross-sectional area of the tube opening 22 in the direction perpendicular to the air inlet direction is greater than the cross-sectional area of the air outlet opening 3320 in the direction perpendicular to the air outlet direction. In this way, with the design of the tube opening 22 with a relatively large cross-section, in one aspect, in the suction mode, a relatively large foreign object is less likely to fail to pass through the tube opening 22 to enter the blowing-suction tube 2 or a relatively large foreign object is less likely to clog the tube opening 22. In another aspect, with the design of the air outlet opening 3320 with a relatively small cross-section, a flow speed of an air flow can be increased.

In this implementation, the airflow generation apparatus 3 is an independent integral structure. The independent integral structure is rotatably mounted on the body 1. That is, when the blower vacuum 100 switches between the blowing mode and the suction mode, the airflow generation apparatus 3 provided with the motor 31 and the fan 32 generally rotates relative to the main unit housing 10. Therefore, when the blower vacuum 100 switches between the blowing position and the suction position, it may be not necessary to stop the operation of the motor 31 and the fan 32. A user may directly switch between blowing and suction while the motor 31 and the fan 32 are in a working state. That is, when the blower vacuum 100 switches between the blowing mode and the suction mode, the motor 31 can be still relative to the fan 32, and the motor 31 rotates relative to the body 1. Preferably, in the example shown in the figure, the airflow generation apparatus 3 rotates around the body 1 by 90 degrees to switch between blowing and suction. When the air inlet portion 331 of the airflow generation apparatus 3 rotates to be vertically upward (aligned with the body air inlet portion 13), the blowing mode is entered. When the air inlet portion 331 rotates to the right (aligned with the first end 21 of the blowing-suction tube 2), the suction mode is entered. In the blowing mode (for example, referring to FIG. 1A), the motor body 311 is located on a rear side of the centrifugal fan 32, and the output shaft of the motor 31 is parallel to the central axis of the blowing-suction tube 2. In the suction mode (for example, referring to FIG. 1B), the motor body 311 is located below the centrifugal fan 32, and the output shaft 312 of the motor 31 is perpendicular to the central axis of the blowing-suction tube 2. The rotational axis A is located below the holding portion 11 and passes through the geometric center of the volute 33.

It should be understood that an angle by which the airflow generation apparatus (the volute 33) rotates during switching from the blowing mode to the suction mode or from the suction mode to the blowing mode is determined by using an angle formed between the air inlet portion 331 and the air outlet portion 332 of the volute 33 around the rotational axis A. The angle is not limited to the 90 degrees described above. For example, the angle may be 90 degrees±20 degrees.

The inventor finds through experiment that compared with the comparison example in which the volute is not rotatable and the blowing-suction tube is separately disposed, both the blowing efficiency and the suction efficiency of the single-tube blower vacuum in this implementation are improved by more than 20%.

In the single-tube blower vacuum 100 in this implementation, for example, compared with the solution in which a blowing tube and a suction tube are changed, it is only necessary to rotate the volute 33 to implement switching between blowing and suction. Therefore, this implementation significantly improves human-machine use comfort.

Further, the single-tube blower vacuum 100 may further include a garbage bag 7 connected to the body 1 and used as an example of the collection apparatus. Specifically, the garbage bag 7 is connected to the air outlet portion 332, is located below the body 1, and is used for collecting a foreign object entering from the tube opening 22 of the blowing-suction tube 2. The garbage bag 7 is at least partially made of an air-permeable material and is used for accommodating debris such as leaves sucked in from the blowing-suction tube 2. The garbage bag 7 includes a main body 71, a strap 72, and a connection port 73 used for connection to the air outlet portion 332 of the volute 33. The single-tube blower vacuum 100 may further include a power plug 4 and is powered by an alternating-current power. However, the present invention is not limited thereto. The single-tube blower vacuum 100 may further be powered by a direct-current power, for example, a lithium battery.

A manner of implementing switching between blowing and suction of the single-tube blower vacuum 100 according to this implementation is described below.

As shown in FIG. 1A, when the air inlet portion 331 of the volute 33 is connected to the first end 21 of the blowing-suction tube 2 and the air outlet portion 332 of the volute 33 is connected to the connection port 73 of the garbage bag 7, the single-tube blower vacuum 100 is in the suction mode. The fan 32 rotates in the volute 33. The rotation of the fan 32 draws an external airflow into the volute 33 through the blowing-suction tube 2. The external airflow is guided in the volute 33 to blow into the garbage bag 7 from the air outlet portion 332. Debris sucked by the airflow is collected in the garbage bag 7.

In the suction mode shown in FIG. 1A, the airflow generation apparatus 3 (the volute 33) rotates in the direction indicated by an arrow P1 relative to the body 1 and the blowing-suction tube 2 by 90 degrees to enable the single-tube blower vacuum 100 to enter the blowing mode.

As shown in FIG. 1B, in the blowing mode, the air inlet portion 331 of the volute 33 is in fluid communication with the body air inlet portion 13 of the body 1, and the air outlet portion 332 of the volute 33 is in fluid communication with the first end 21 of the blowing-suction tube 2. The fan 32 rotates in the volute 33. The rotation of the fan 32 draws an external airflow into the volute 33 through the body air inlet portion 13. The external airflow is guided in the volute 33 to blow into the blowing-suction tube 2 from the air outlet portion 332 and is blown out from the second end 22 of the blowing-suction tube 2.

In the blowing mode shown in FIG. 1B, the airflow generation apparatus (the volute 33) rotates in the direction indicated by an arrow P2 relative to the body 1 and the blowing-suction tube 2 by 90 degrees to enable the single-tube blower vacuum 100 to enter the suction mode. As shown in FIG. 1A and FIG. 1B, the arrows P1 and P2 have opposite directions.

To implement that the airflow generation apparatus 3 rotates relative to the body 1, the blower vacuum 100 further includes a blowing-suction switching mechanism, and the blowing-suction switching mechanism operably drives the volute 33 to rotate around the rotational axis A between the blowing position in the blowing mode and the suction position in the suction mode. Specifically, when the volute 33 rotates from the blowing position to the suction position, the blowing-suction switching mechanism can drive the first end 21 of the blowing-suction tube 2 to be joined to and in communication with the air inlet portion 331. When the volute 33 rotates from the suction position to the blowing position, the blowing-suction switching mechanism can drive the first end 21 of the blowing-suction tube 2 to face the air outlet portion 332.

Figure 11:
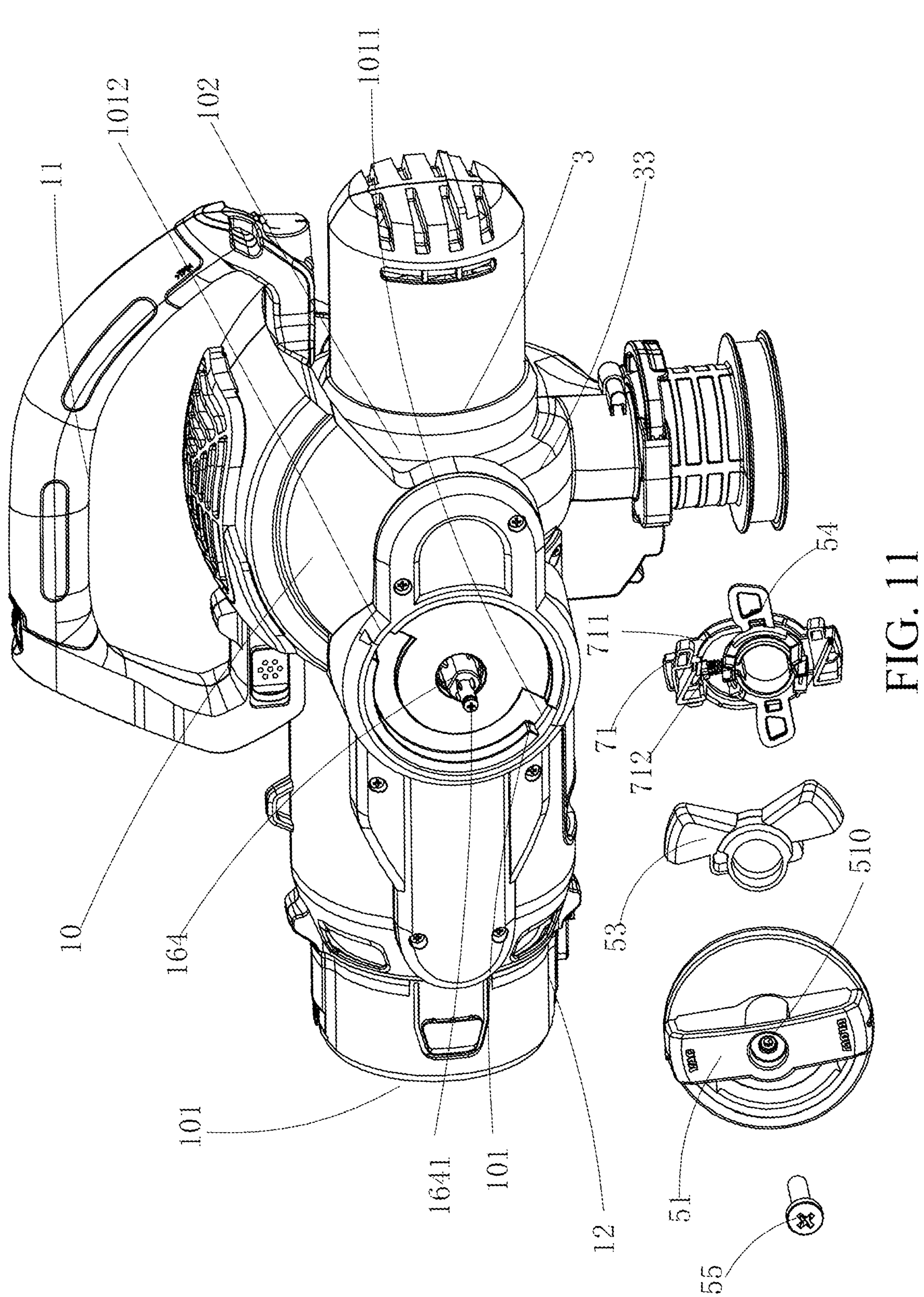
FIG. 11 is a partial exploded view of a blower vacuum with a blowing-suction tube and a power supply apparatus removed according to the present invention.
Figure 12:
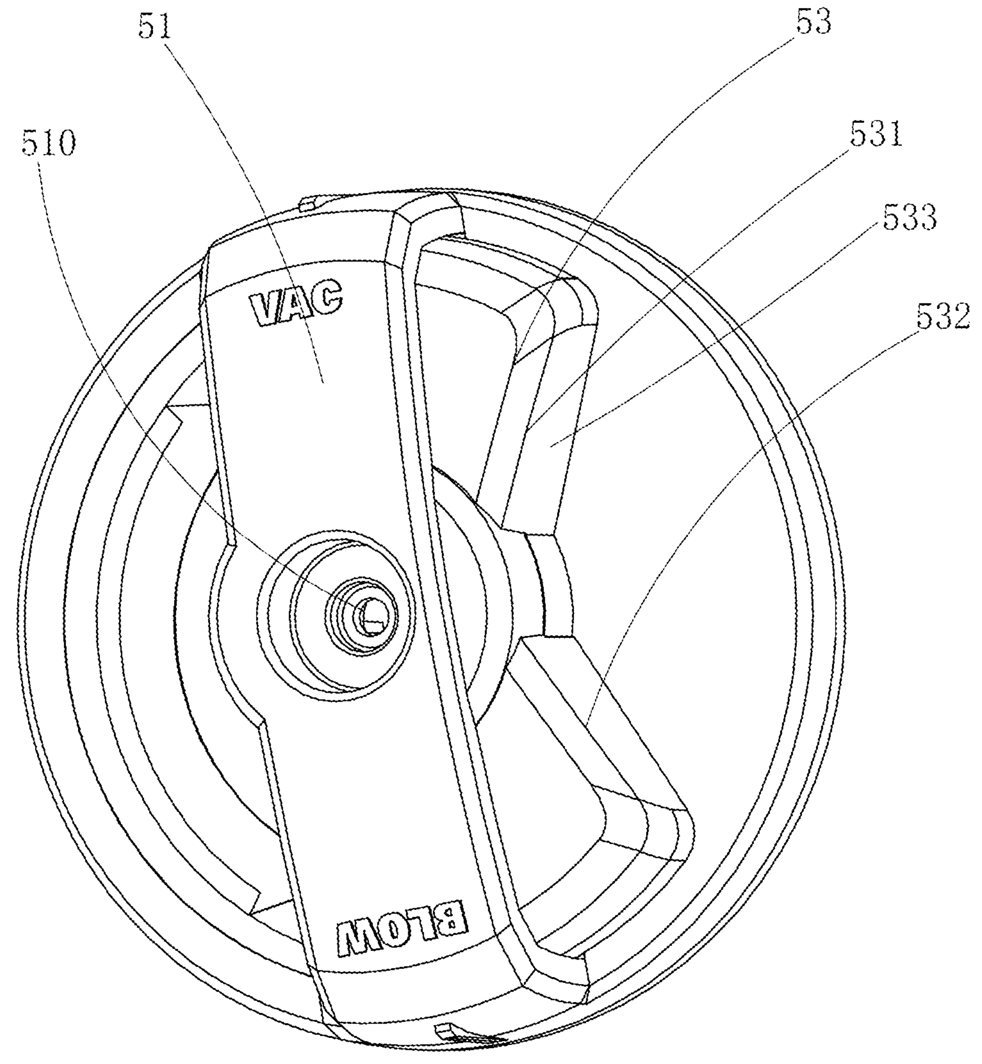
FIG. 12 is a three-dimensional schematic diagram of an operation button and a locking mechanism according to a first implementation of the present invention.
Figure 13:
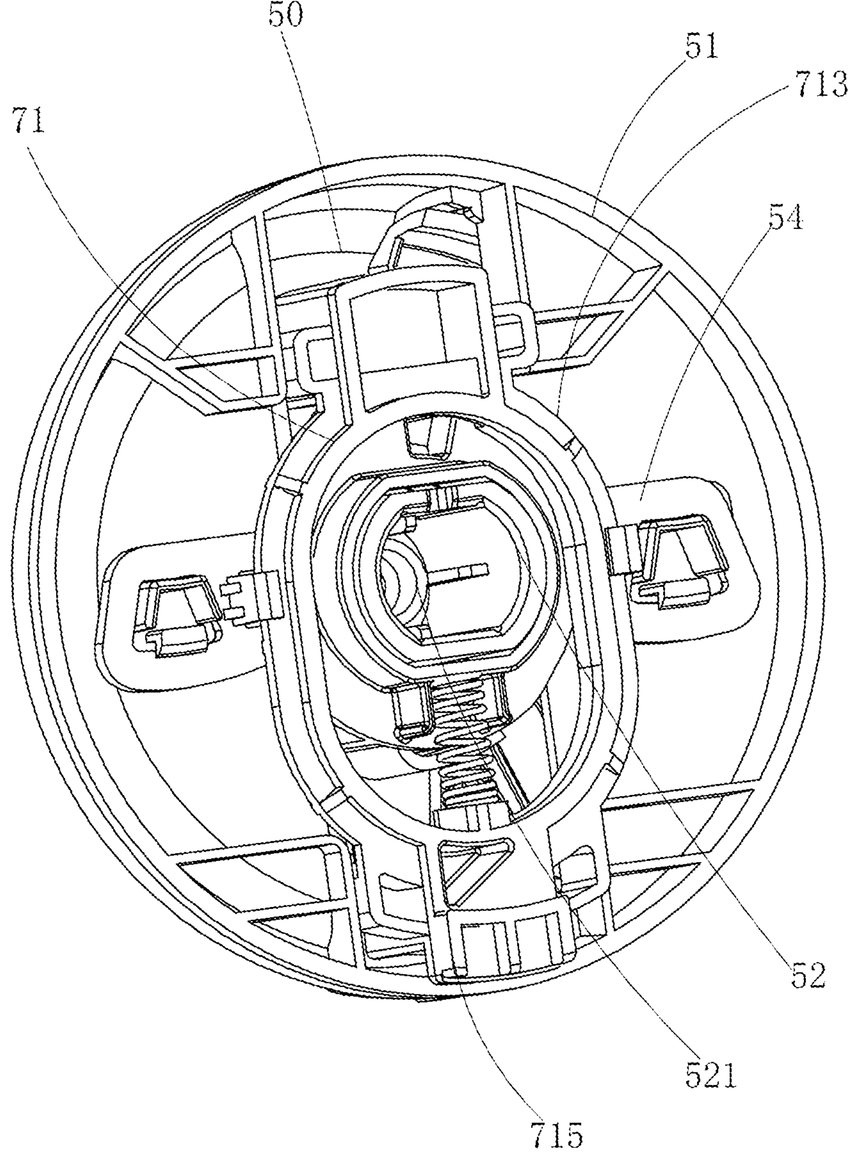
FIG. 13 is a three-dimensional schematic diagram of the operation button and the locking mechanism shown in FIG. 12 from another perspective.
Figure 14:
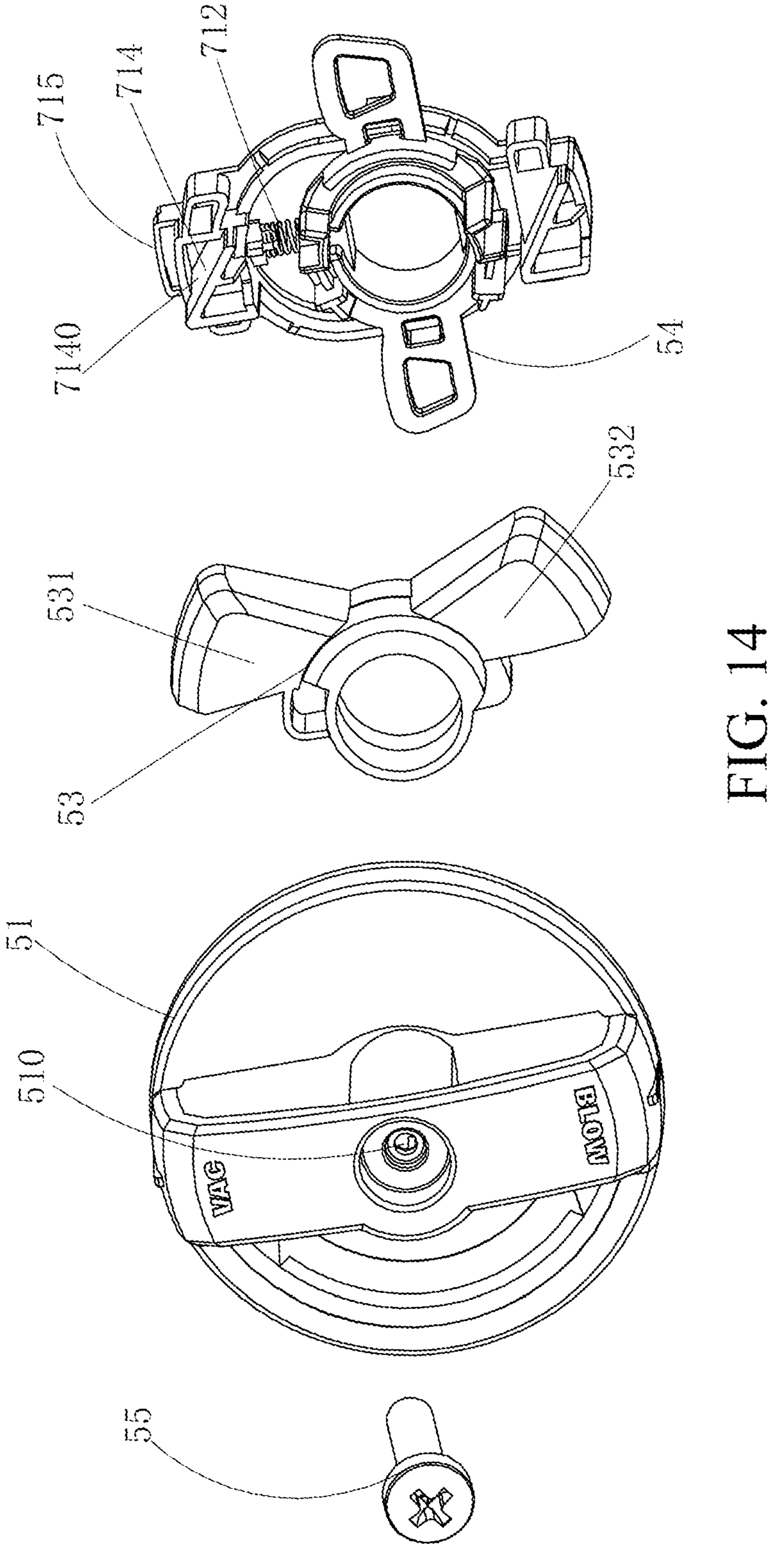
FIG. 14 is a partial exploded view of an operation component and a locking mechanism shown in FIG. 12.
Figure 15:
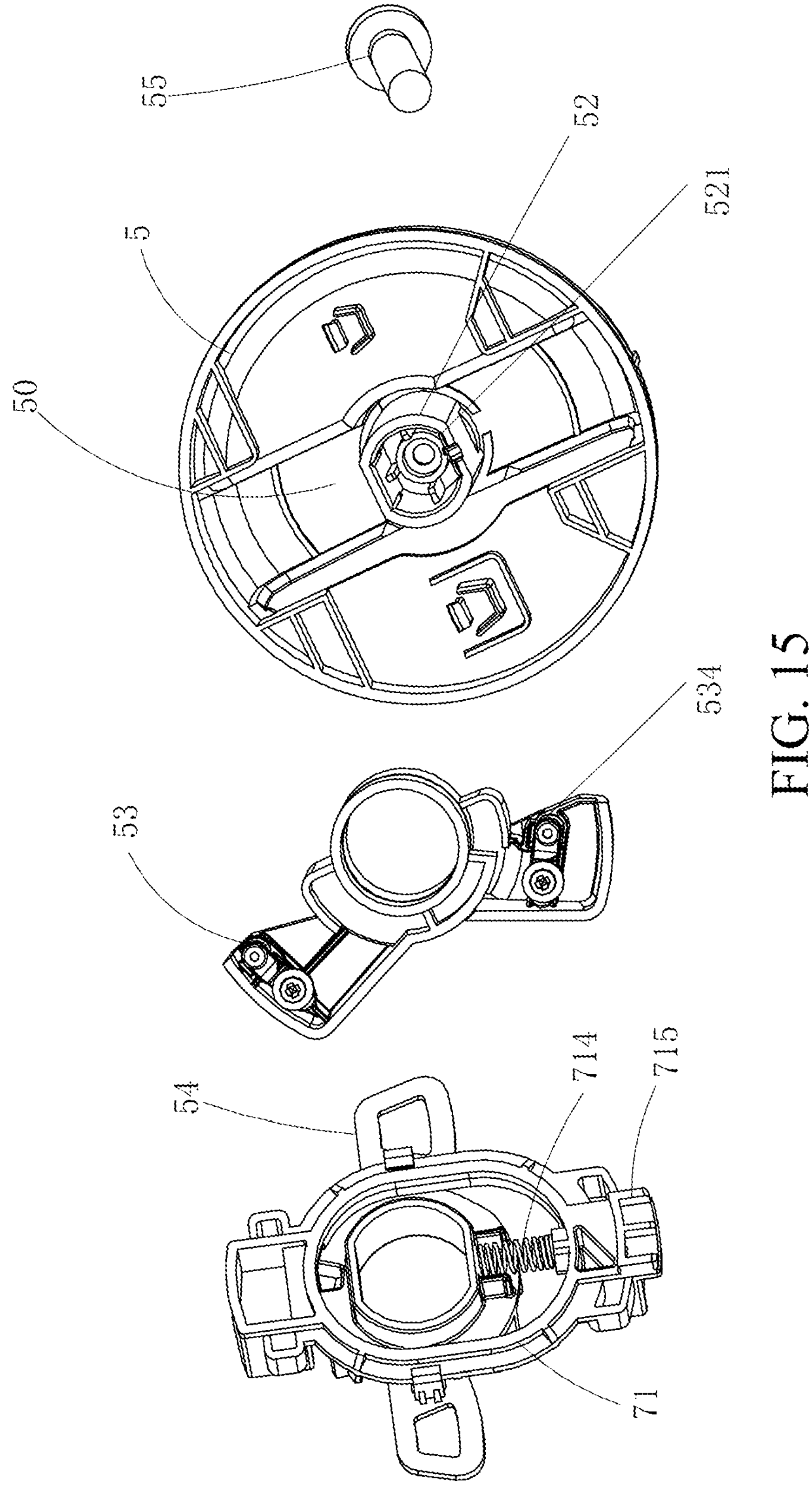
FIG. 15 is a schematic diagram of the partial exploded view shown in FIG. 14 from another perspective.
Figure 16:
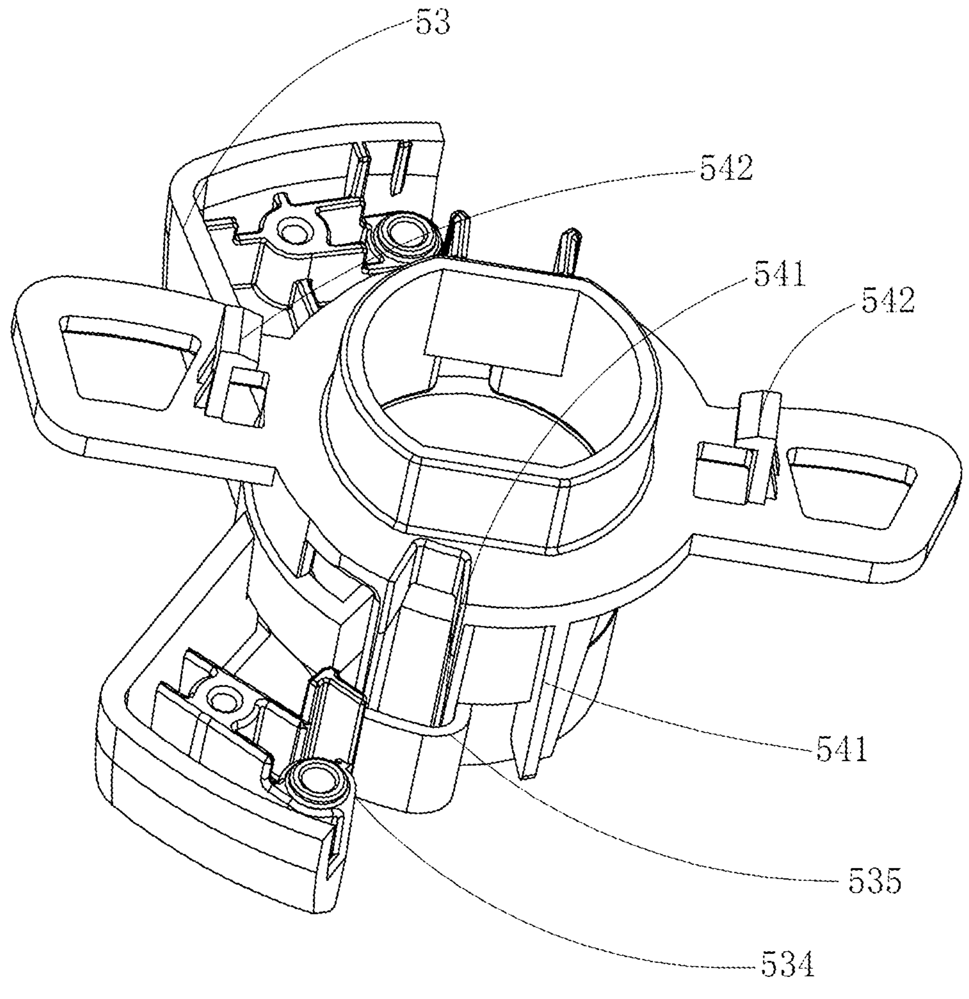
FIG. 16 is a partial three-dimensional schematic diagram of the structure shown in FIG. 12.

As shown in FIG. 11 and FIG. 17, to enable a user to operate the volute 33 to rotate relative to the body 1 and the blowing-suction tube 2, the blowing-suction switching mechanism includes an operation component 5 that may connect the rotational axis A of the volute 33 and is used as an example of a rotation driving portion. The operation component drives the volute 33 to rotate relative to the body 1 and the blowing-suction tube 2. It should be understood that the motor 31 and the volute 33 may be completely or partially accommodated in the housing of the body 1, provided that the operation component 5 is exposed. It should be noted that the operation component herein may be understood as an operation button in an example.

The blowing-suction switching mechanism and action processes of the blowing-suction tube and the volute in a first implementation are described below.

In this embodiment, as shown in FIG. 1A and FIG. 1B, the blowing-suction switching mechanism includes a toggle 9. When the blower vacuum 100 switches from the suction mode to the blowing mode, the toggle controls the first end 21 of the blowing-suction tube 2 to be disengaged from the air inlet portion 331, and the operation component drives the volute 33 to rotate relative to the main unit housing 10 to the blowing position. When the blower vacuum 100 switches from the blowing mode to the suction mode, the toggle 9 controls the first end 21 of the blowing-suction tube 2 to be disengaged from the air outlet portion 332, and the operation component 5 drives the volute 33 to rotate relative to the main unit housing 10 to the suction position.

Specifically, as shown in FIG. 1A and FIG. 1B, the central position of the toggle 9 is pivotally mounted on the body 1 by a pivotal shaft 14. A long hole 91 is formed at the first end of the toggle 9, and a pivotal shaft 23 extending from a sidewall of the blowing-suction tube 2 is inserted in the long hole 91. A second end of the toggle 9 is exposed from the body 1. In this way, the second end of the toggle 9 may be pushed to enable the toggle 9 to rotate around the pivotal shaft 14, so as to drive the first end 21 of the blowing-suction tube 2 to move between a first position near the airflow generation apparatus 3 and a second position away from the airflow generation apparatus (volute 33).

For example, during switching from the suction mode in FIG. 1A to the blowing mode in FIG. 1B, first, the second end of the toggle 9 is pulled to enable the first end 21 of the blowing-suction tube 2 to move away from the volute 33 to be detached from the air inlet portion 331 of the volute 33 (that is, the blowing-suction tube 2 is located at the second position). Next, the rotation of the operation component 5 is used to rotate the airflow generation apparatus (volute 33), to enable the air outlet portion 332 of the volute 33 to be aligned with the first end 21 of the blowing-suction tube 2. Finally, the second end of the toggle 9 is pushed to enable the first end 21 of the blowing-suction tube 2 to move toward the volute 33 to face the air outlet portion 332 of the volute 33.

In this implementation, at least a part of the blowing-suction tube 2 is slidably connected to the blowing-suction tube connecting portion 12 of the body 1. Specifically, a channel for an airflow to flow through is provided in an inner cavity of the blowing-suction tube 2. In an example, the blowing-suction tube 2 may be one blowing-suction tube 2 that is formed of a plurality of sections and has a complete blowing function or suction function. Referring to FIG. 9 and FIG. 10, the blowing-suction tube 2 includes a first sub-blowing-suction tube 26 away from the airflow generation apparatus 3 and a second sub-blowing-suction tube 27 near the airflow generation apparatus 3. The second sub-blowing-suction tube 27 operably displaces in an axial direction. The second sub-blowing-suction tube 27 has the first position near the airflow generation apparatus 3 and the second position away from the airflow generation apparatus 3. The toggle 9 controls the second sub-blowing-suction tube 27 to move toward the first position or controls the second sub-blowing-suction tube 27 to move toward the second position. It is easily understood that when the blower vacuum 100 switches between the blowing mode and the suction mode, the first sub-blowing-suction tube 26 does not displace relative to the body 1, and only the second sub-blowing-suction tube 27 is slidably connected to the blowing-suction tube connecting portion of the body 1. In other words, in this embodiment, when the blower vacuum 100 is in the blowing mode or the suction mode, an axial distance between the foremost end (which may be understood as the foremost end of the tube opening 22) of the blowing-suction tube 2 and the rotational axis A remains unchanged. More specifically, in the blowing mode, when the second sub-blowing-suction tube 27 is at the first position, the second sub-blowing-suction tube 27 faces the air outlet portion 332. In the suction mode, when the second sub-blowing-suction tube 27 is at the first position, the second sub-blowing-suction tube 27 is connected to the air inlet portion 331.

It should be noted that the second sub-blowing-suction tube 27 herein may also be understood as an independent structure rather than a part of the blowing-suction tube 2. For example, in some implementations, the blowing-suction tube 2 may be alternatively fixedly connected to the body 1. The body further includes an adaptation portion (not shown in the figure). The adaptation portion is connected to the blowing-suction tube 2 and is movable relative to the blowing-suction tube 2 between the first position near the airflow generation apparatus (the volute 33) and the second position away from the airflow generation apparatus (the volute 33). The adaptation portion may be driven by a structure similar to the toggle 9. An example in which the toggle 9 drives the adaptation portion to move at different positions is used for detailed description below. In the suction mode, the air inlet portion 331 of the volute 33 is sleeved over the adaptation portion to implement sealing. In the blowing mode, the air outlet portion 332 of the volute 33 is clamped to the adaptation portion, to inhibit the shaking of the blowing-suction tube 2. During switching from the suction mode to the blowing mode, the adaptation portion is moved toward the second position away from the volute 33 to enable the adaptation portion to be detached from the air inlet portion 331 of the volute 33. Next, the airflow generation apparatus (the volute 33) is rotated to enable the air outlet portion 332 of the volute 33 to be aligned with the adaptation portion. Finally, the second end of the toggle 9 is pushed to enable the adaptation portion to move toward the first position near the volute 33 to be joined to the air outlet portion 332 of the volute 33. During switching from the blowing mode to the suction mode, the adaptation portion is moved toward the second position away from the volute 33 to enable the adaptation portion to be detached from the air outlet portion 332 of the volute 33. Next, the airflow generation apparatus (the volute 33) is rotated to enable the air inlet portion 331 of the volute 33 to be aligned with the adaptation portion. Finally, the second end of the toggle 9 is pushed to enable the adaptation portion to move toward the first position near the volute 33 to be joined to the air inlet portion 331 of the volute 33. With such an arrangement, in one aspect, it can be similarly implemented that the airflow generation apparatus (the volute 33) is rotated to switch between the blowing mode and the suction mode. In the blowing mode, the fastening between the blowing-suction tube 2 and the air outlet portion 332 of the volute 33 is implemented, to avoid the shaking of the blowing-suction tube 2. In another aspect, in the suction mode, the sealing between the blowing-suction tube 2 and the air inlet portion 331 of the volute 33 can be similarly implemented, so that a miscellaneous object sucked in the suction mode can smoothly enter a garbage bag through the blowing-suction tube 2 and the volute 33.

Certainly, when the airflow generation apparatus 3 switches between the blowing mode and the suction mode, the second sub-blowing-suction tube 27 or the adaptation portion may be alternatively directly linked to move from the first position to the second position. A specific structure and a movement process of the linkage are described below in detail.

The blowing-suction switching mechanism and action processes of the blowing-suction tube 2 and the volute 33 in a second implementation are described below with reference to FIG. 3A to FIG. 4F and FIG. 11 to FIG. 19.

In a first implementation, the rotation of the airflow generation apparatus 3 (the volute 33) and an axial movement of the blowing-suction tube 2 are independent of each other. In this implementation, the blowing-suction switching mechanism is a linkage apparatus 7. The linkage apparatus 7 can drive the first end 21 of the blowing-suction tube 2 to be away from the air inlet portion 331 or the air outlet portion 332 of the volute 33 by a preset distance, and can link the volute 33 to rotate relative to the main unit housing 10 to the blowing position in the blowing mode or to the suction position in the suction mode. When the volute 33 rotates from the blowing position to the suction position, the linkage apparatus 7 can link the first end 21 of the blowing-suction tube 2 to face the air inlet portion 331. When the volute 33 switches from the suction mode to the blowing mode, the linkage apparatus 7 can link the first end 21 of the blowing-suction tube 2 face the air outlet portion 332.

It should be noted that in "the linkage apparatus 7 can drive the first end 21 of the blowing-suction tube 2 to be away from the air inlet portion 331 or the air outlet portion 332 of the volute 33 by a preset distance", the preset distance herein may be understood as that the first end 21 of the blowing-suction tube 2 is completely separated from the air inlet portion 331 or the air outlet portion 332 of the volute 33 or may be understood as that an end surface of the first end 21 of the blowing-suction tube 2 is at least partially attached to an end surface of the air inlet portion 331 or the air outlet portion 332 of the volute 33, provided that the first end 21 of the blowing-suction tube 2 and the air inlet portion 331 or the air outlet portion 332 of the volute 33 do not overlap in a direction perpendicular to the axial direction.

The linkage apparatus 7 links the rotation of the airflow generation apparatus (the volute 33) and the axial movement of the blowing-suction tube 2, thereby simplifying a blowing-suction switching operation. Specifically, the linkage apparatus 7 can drive the first end 21 of the blowing-suction tube 2 to make an axial movement relative to the airflow generation apparatus 3, and can link the airflow generation apparatus 3 to rotate relative to the body 1 to the blowing position in the blowing mode or to the suction position in the suction mode. In the blowing mode, the linkage apparatus 7 can link the first end 21 of the blowing-suction tube 2 to be in communication connection to the air outlet portion 332. In the suction mode, the linkage apparatus 7 can link the first end 21 of the blowing-suction tube 2 to be in communication connection to the air inlet portion 331. As the linkage apparatus 7 drives the airflow generation apparatus 3 to rotate, the motor 31 can be in a state of driving the fan 32 to rotate.

In this implementation, the same reference numerals are marked for the same parts in the first implementation, and detailed description of these parts is omitted. In addition, for clear description, a partial structure of the single-tube blower vacuum is omitted in FIG. 3A and FIG. 3B.

The structure of the linkage apparatus of the volute 33 according to this implementation is described below with reference to FIG. 3A to FIG. 4F and FIG. 11 to FIG. 19.

The linkage apparatus 7 in this implementation includes a connecting rod 25, a rotary disk 16, and a convex rod 17 and a linkage member 73 that extend from the rotary disk 16.

One end of the connecting rod 25 is connected to the first end 21 of the blowing-suction tube 2 by a pivotal shaft 24. The pivotal shaft 24 further passes through the body 1, and in particular, passes through a guide rail (or a guide groove) 15 formed on the blowing-suction tube connecting portion 12. The guide rail 15 extends in the axial direction of the blowing-suction tube 2 to guide an axial movement of the pivotal shaft 24. When the pivotal shaft 24 makes an axial movement relative to the guide rail 15, the blowing-suction tube 2 is driven to make an axial movement relative to the body 1. The other end of the connecting rod 25 is pivotally connected to a peripheral edge hole 163 at a peripheral edge of the rotary disk 16.

The rotary disk 16 is rotatably mounted on the body 1 by a pivotal shaft B. The rotary disk 16 includes a convex arc-shaped surface (peripheral surface) 161 and a notch 162 that is concave toward a radial inner side from the arc-shaped surface 161. It should be understood that the notch 162 may extend only in a partial thickness of the rotary disk 16. The notch 162 may also extend beyond the whole thickness (referring to FIG. 4A to FIG. 4F) of the rotary disk 16.

The first end of the convex rod 17 is fastened to the rotary disk 16, and a second end of the convex rod 17 extends outward from a peripheral edge of the rotary disk 16 from the position of the notch 162. The second end of the convex rod 17 may be connected to a pivotal shaft (or a pivotal shaft and a roller) 171.

Figure 4A:
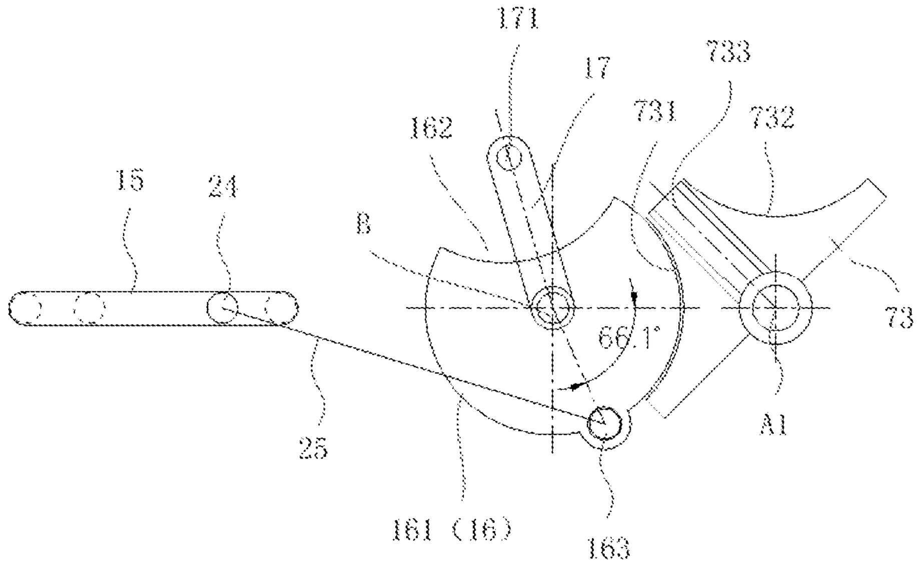
FIG. 4A to FIG. 4F show an action process of a linkage apparatus according to the present invention.

The linkage member 73 is fixedly connected to the volute 33 by a pin A1. The linkage member 73 includes a concave-arc-shaped first sliding surface 731, a concave-arc-shaped second sliding surface 732, and an opening groove 733 located between the two sliding surfaces 731 and 732. The opening groove 733 may accommodate the pivotal shaft 171 at the second end of the convex rod 17. An arm portion formed with the opening groove 733 on the linkage member 73 may extend into the notch 162 of the rotary disk 16 without interfering with the rotation of the rotary disk 16. The first sliding surface 731 and the second sliding surface 732 match the arc-shaped surface 161 of the rotary disk 16. Referring to FIG. 4A, when the blower vacuum 100 is in the blowing mode, the arc-shaped surface 161 of the rotary disk 16 faces the first sliding surface 731. Referring to FIG. 4D, when the airflow generation apparatus 3 switches to the suction mode, the arc-shaped surface 161 of the rotary disk 16 faces the second sliding surface 732.

Figure 3A:
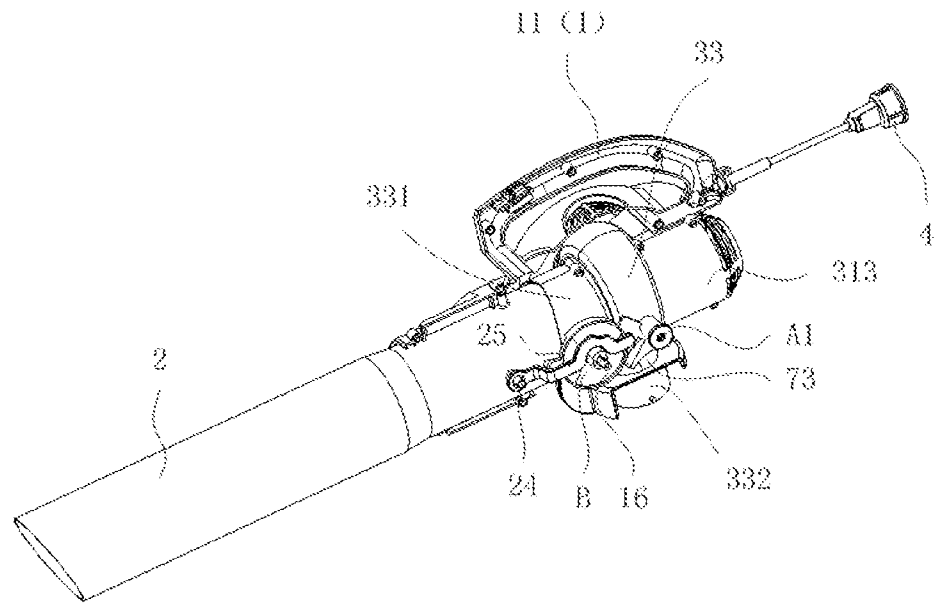
FIG. 3A and FIG. 3B show a single-tube blower vacuum according to the present invention, where a partial structure is omitted to show a linkage apparatus.
Figure 3B:
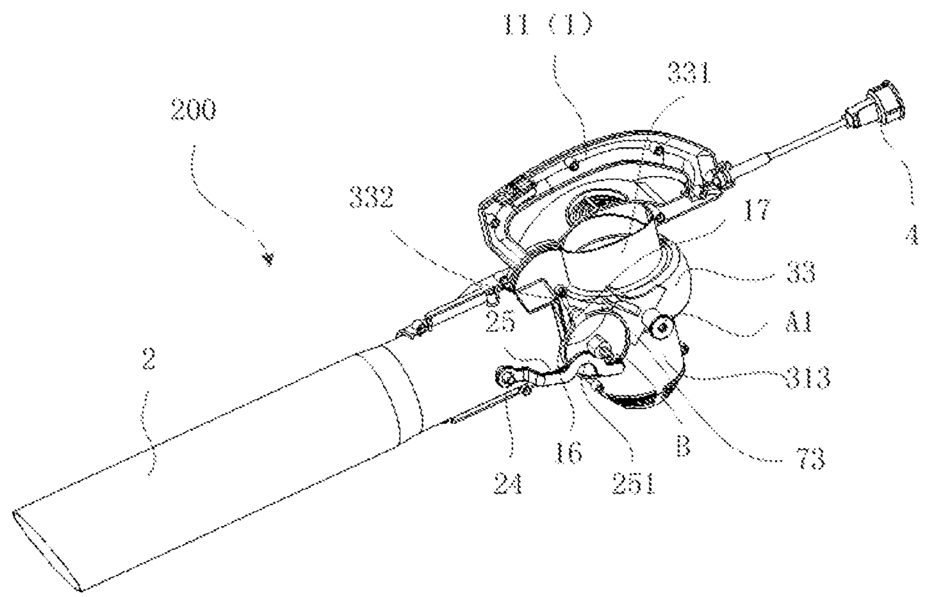

Referring to FIG. 3A and FIG. 3B, a bending portion 251 is formed near the second end, connected to the rotary disk 16, of the connecting rod 25, so that the pivotal shaft B protruding from the rotary disk 16 does not affect the movement of the connecting rod 25. After extending from the body 1, the pivotal shaft B may be connected to the corresponding operation component 5, so as to drive the rotary disk 16 to rotate. Specifically, the rotary disk 16 is disposed between the airflow generation apparatus 3 and the operation component 5. The pivotal shaft B is specifically an anti-rotation plug 164 extending toward the operation component 5. The anti-rotation plug 164 is at least partially disposed as a flat rectangular structure. The anti-rotation plug is inserted with a threaded structure 1641 in a transverse direction.

It should be understood that another pin extending from the body 1 may be disposed at an eccentric position that does not interfere with the connecting rod 25 on the rotary disk 16. In this case, an arc-shaped groove for the another pin to rotate through is formed on the body 1. In this solution, the pivotal shaft B does not necessarily protrude from the surface, near the connecting rod 25, of the rotary disk 16. The connecting rod 25 does not necessarily have the foregoing bending portion 251.

The action process of the linkage apparatus according to this implementation is described below with reference to FIG. 3A to FIG. 4F and FIG. 11 to FIG. 19.

FIG. 4A to FIG. 4F show a switching process from the blowing mode of the blower vacuum to the suction mode of the blower vacuum. As shown in FIG. 3B and FIG. 4A, in the blowing mode, the first end 21 of the blowing-suction tube 2 is connected to the air outlet portion 332 of the volute 33. The pivotal shaft 24 mounted on the blowing-suction tube 2 is located at an end, near the volute 33, of the guide rail 15. The first sliding surface 731 of the linkage member 73 is in slidable contact with the arc-shaped surface 161 of the rotary disk 16. The pivotal shaft 171 of the convex rod 17 is separate from the opening groove 733.

The rotary disk 16 is rotated in a clockwise direction from the state. The pivotal shaft 24 (the blowing-suction tube 2)

makes an axial movement away from the volute 33. The first sliding surface 731 of the linkage member 73 slides relative to the arc-shaped surface 161 of the rotary disk 16. The linkage member 73 (the volute 33) is still.

Figure 4B:
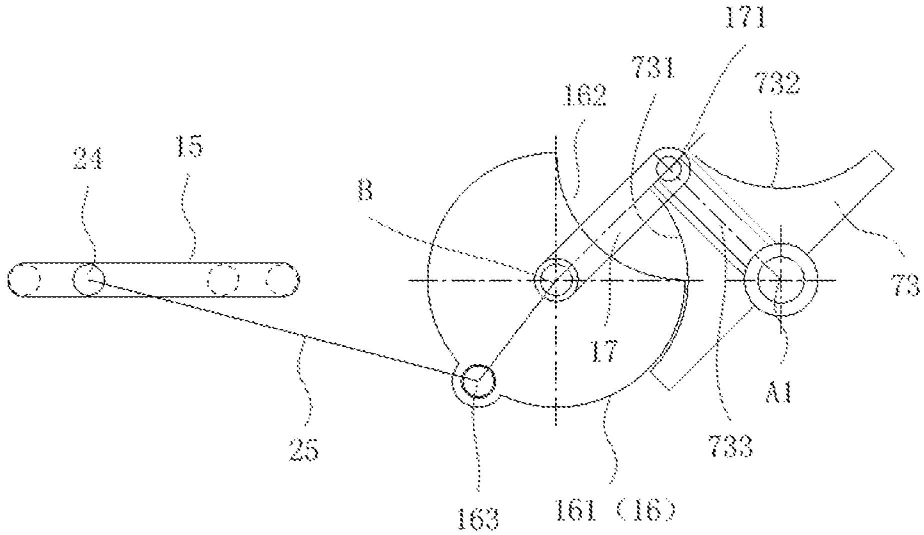

As shown in FIG. 4B, after rotation from the state shown in FIG. 4A by a particular angle, the pivotal shaft 24 is away from an end, close to the volute 33, of the guide rail 15 (that is, the pivotal shaft 24 makes a forward axial movement). The blowing-suction tube 2 is detached from the volute 33. The pivotal shaft 171 of the convex rod 17 starts to be joined to the opening groove 733 of the linkage member 73. At least before this point, the fitting between the arc-shaped surface 161 of the rotary disk 16 and the first sliding surface 731 of the linkage member 73 is used to position the linkage member 73. This ensures that the pivotal shaft 171 of the convex rod 17 can be reliably joined to the opening groove 733 of the linkage member 73.

It should be understood that the width of the opening groove 733 may be slightly greater than the diameter of the pivotal shaft 171, so that the pivotal shaft 171 easily enters the opening groove 733 and the pivotal shaft 171 is prevented from being stuck in the opening groove 733.

Figure 4C:
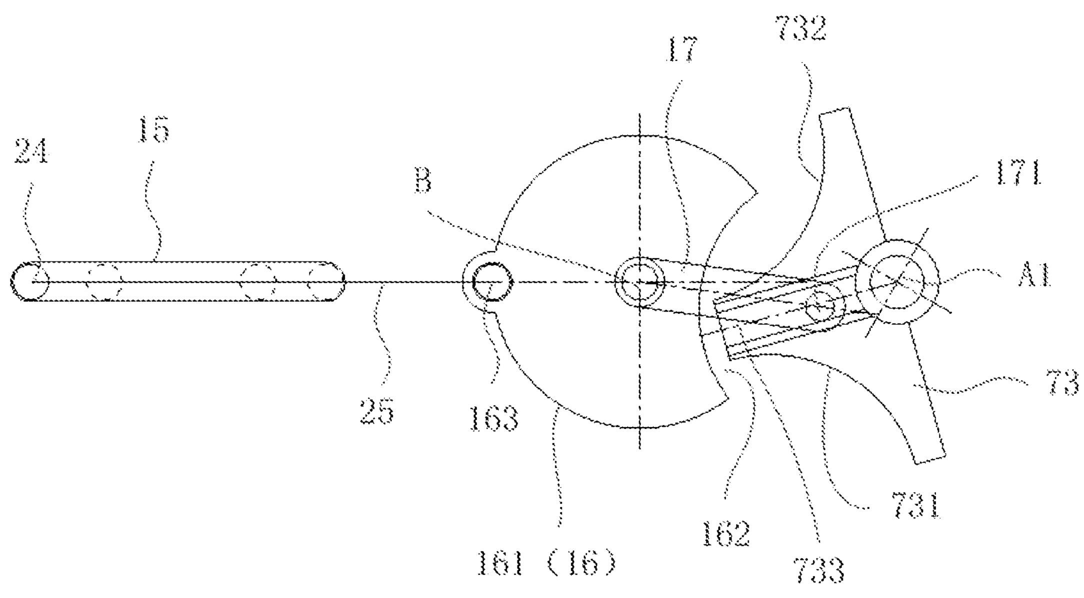
Figure 4D:
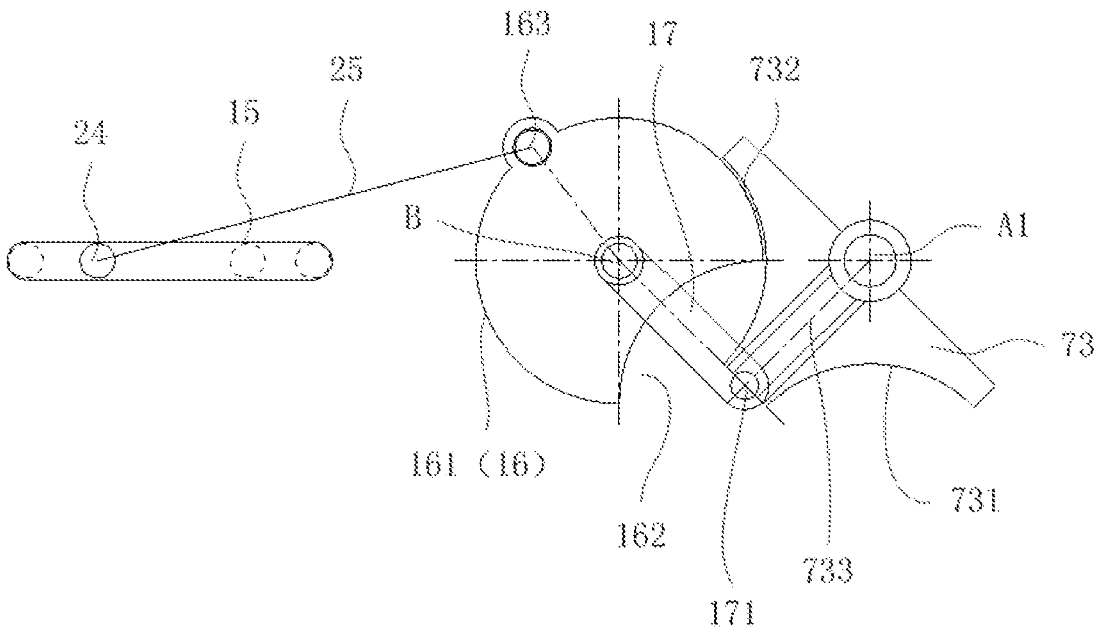

Subsequently, as shown in FIG. 4C, the rotary disk 16 continues to rotate, the pivotal shaft 24 moves to a limit position at an end, away from the volute 33, of the guide rail 15, and the convex rod 17 drives the linkage member 83 to rotate, to enable the volute 33 to rotate.

In this implementation, from the state in FIG. 4A to the state in FIG. 4D, the linkage member 83 (the volute 33) rotates by 90 degrees. As shown in FIG. 4D, the pivotal shaft 171 of the convex rod 17 starts to be detached from the opening groove 733 of the linkage member 73. The arc-shaped surface 161 of the rotary disk 16 matches the second sliding surface 732 of the linkage member 73, and the rotary disk 16 inhibits the rotation of the linkage member 73. In the state shown in FIG. 4D, the air inlet portion 331 of the volute 33 is aligned with the first end 21 of the blowing-suction tube 2.

Figures 4E, 4F:
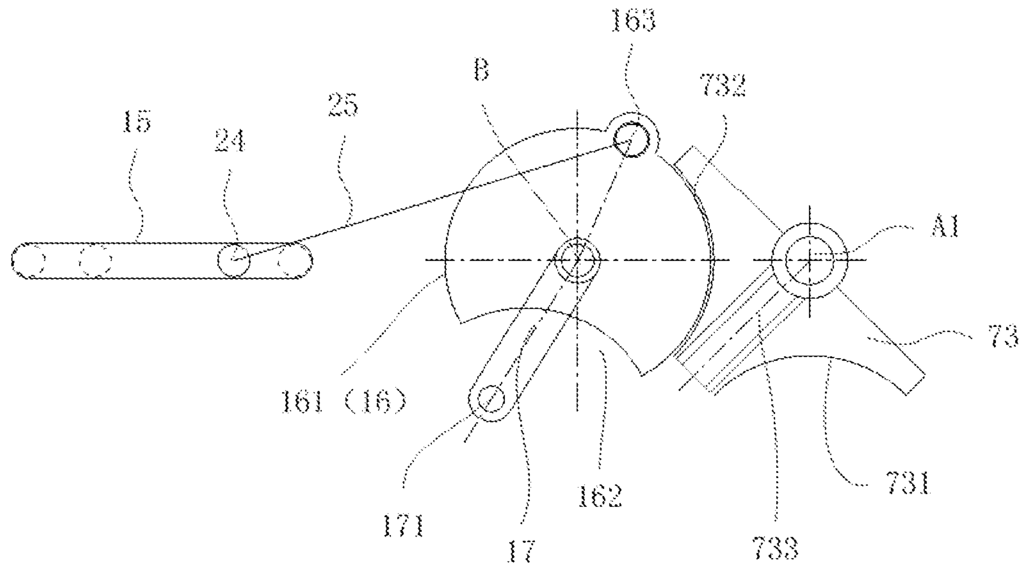

As shown in FIG. 4E, the rotary disk 16 continues to rotate in a clockwise direction, and the pivotal shaft 24 at a first end of the connecting rod 25 drives the blowing-suction tube 2 to approach the volute 33 to enable the first end 21 of the blowing-suction tube 2 to start to be joined to the air inlet portion 331 of the volute 33. In this case, the linkage member 83 (the volute 33) does not rotate.

Referring to FIG. 4F and FIG. 3A, the rotary disk 16 rotates in a clockwise direction to a final position, the pivotal shaft 24 moves to a limit position at an end, near the volute 33, of the guide rail 15, the blowing-suction tube 2 is joined in a completely sealed manner to the air inlet portion 331 of the volute 33, and the single-tube blower vacuum 100 is in a suction state.

A process in which the blower vacuum 100 switches from the blowing mode to the suction mode is described above. It should be understood that in the order from FIG. 4F to FIG. 4A, it is only necessary to rotate the rotary disk 16 in a counterclockwise direction to switch the blower vacuum 100 from the suction mode to the blowing mode.

As described above, the connecting rod 25 and the rotary disk 16 in the linkage apparatus in this implementation form a crank connecting rod mechanism, so that the rotation of the rotary disk 16 may be converted into the axial movement of the blowing-suction tube 2. The rotary disk 16, the convex rod 17, and the linkage member 73 in the linkage apparatus in this implementation form a Geneva mechanism, so that the continuous rotation of the rotary disk 16 may be converted into intermittent rotation of the linkage member 73 (the volute 33). In this implementation, the crank connecting rod mechanism and the Geneva mechanism are integrated to provide a linkage apparatus with a simple structure.

As described above, the linkage member 73 includes two movement processes. When the linkage member 73 slides relative to the arc-shaped surface 161 of the rotary disk 16, the position of the linkage member 73 does not change. When the linkage member 73 is joined to the convex rod 17, the rotation of the linkage member 73 is implemented, and the rotational angle is 90 degrees. Referring to FIG. 4A to FIG. 4F, the rotational angle of the rotary disk 16 is greater than the rotational angle of the linkage member 73 (the volute 33), and is less than or equal to 360 degrees.

Compared with the first implementation in which the toggle 9 is pushed to enable the blowing-suction tube 2 to be separate from the volute 33, the volute 33 is then rotated, and finally the toggle 9 is pushed to enable the blowing-suction tube 2 to be joined to the volute 33, in this implementation, it is only necessary to rotate the rotary disk 16 to implement switching between the blowing and suction, so that the human-machine use comfort is further improved.

Further, the weight of the motor 31 accounts for a very large part in the weight of the entire airflow generation apparatus 3. Therefore, there is a risk that when rotating to the suction position, the airflow generation apparatus 3 further accidentally moves to the blowing position along the arrow P1 because the weight of the motor 31 is relatively heavy. There is also a risk that the airflow generation apparatus 3 rotates because of an accidental touch or another unexpected situation, affecting use of a user. To avoid these risks, in this implementation, the linkage apparatus 7 further includes a locking mechanism 71 capable of limiting the airflow generation apparatus 3 at the blowing position or limiting the airflow generation apparatus at the suction position.

As shown in FIG. 11, in the transverse direction, the locking mechanism 71 is disposed between the operation component 5 and the main unit housing 10.

As shown in FIG. 11 to FIG. 16, the operation component 5 includes a hand wheel 51 provided with a concave accommodating cavity 50, a base 52 disposed in the accommodating cavity 50 of the hand wheel 51 and protruding toward the airflow generation apparatus 3, a press member 53 at least partially accommodated in the hand wheel 51, and a limit member 54 sleeved over the base 52 and limiting the locking mechanism 71 from disengagement. The base 52 is a pillar structure, and the base 52 and the hand wheel 51 are integrally disposed. The base 52 is provided with an anti-rotation socket 521 extending in the transverse direction. The anti-rotation socket 521 is a flat rectangular slot adapting to the anti-rotation plug 164 with a flat rectangular structure. In this implementation, the anti-rotation plug 164 on the rotary disk 16 is accommodated in the flat rectangular slot, to prevent relative rotation between the hand wheel 51 and the rotary disk 16 when the hand wheel 81 drives the rotary disk 16 to rotate. Further, an outer surface of the hand wheel 51 is further provided with a through hole 510 in communication with the flat rectangular slot. The through hole 510 is used for a screw 55 to pass through for threaded fastening with the threaded structure 1641 on the anti-rotation plug 164.

Specifically, referring to FIG. 11 and FIG. 13 to FIG. 15, the locking mechanism 71 includes a locking member 711 and an elastic member 712. The locking member 711 is at least partially located in the accommodating cavity 50 of the operation component 5 and includes a base portion 713, a fitting portion 714 disposed on the base portion 713, and a locking pin 715 located at a free end of the base portion 713. The main unit housing 10 is provided with a slot 101 that is capable of being locked to and fitting the locking pin 715 of the locking mechanism 71 to lock the blower vacuum 100 in a corresponding working mode. Specifically, the slot 101 includes a first slot 1011 that is capable of being locked to and fitting the locking pin 715 to lock the blower vacuum 100 in the blowing mode and a second slot 1012 that locks the blower vacuum 100 in the suction mode (as shown in FIG. 11). In this implementation, the first slot 1011 and the second slot 1012 are disposed opposite.

As shown in FIG. 11, FIG. 12, and FIG. 14 to FIG. 16, in this implementation, the press member 53 includes a first button 531 and a second button 532 that are pivotally connected to the base 52 and are disposed symmetrically. The first button 531 and the second button 532 are at least partially accommodated in the accommodating cavity 50. Each of the first button 531 and the second button 532 includes an exposed pressing portion 533 to be pressed by an operator, an action portion 534 extending into the accommodating cavity 50 of the operation component 5, and a slide portion 535 that is limited by and fits the limit member 54. The action portion 534 is in contact with the fitting portion 714, so that when the first button 531 and the second button 532 are pressed, the action portion 534 can displace relative to the main unit housing 10 and at the same time push the fitting portion 714 of the locking mechanism 71, so that the locking pin 715 moves away from the first slot 1011 or the second slot 1012, to implement that the operation component 5 can use the rotary disk 16 to drive the airflow generation apparatus 3 to rotate. Specifically, when the blower vacuum 100 needs to switch from the suction mode to the blowing mode, the operation component 5 may move relative to the main unit housing 10 by the preset distance under the effect of an external force, to drive the locking mechanism 71 to compress the elastic member 712 and to be separated from the first slot 1011 of the main unit housing 10. Next, the operation component 5 drives the airflow generation apparatus 3 to rotate from the blowing position to the suction position. Finally, the operation component 5 is released, and the elastic member 712 drives the locking pin 715 to be locked in the second slot 1012. The elastic member 712 is held between the locking mechanism 71 and the operation component 5. More specifically, the elastic member 712 is held between the locking mechanism 71 and the limit member 54, to provide the locking mechanism 71 with a restoring force for driving locking between the locking pin 715 and the second slot 1012. Similarly, when the blower vacuum 100 needs to switch from the blowing mode to the suction mode, the operation component 5 may move relative to the main unit housing 10 by the preset distance under the effect of an external force, to drive the locking mechanism 71 to compress the elastic member 712 and to be separated from the second slot 1012 of the main unit housing 10. Next, the operation component 5 drives the airflow generation apparatus 3 to rotate from the suction position to the blowing position. Finally, the operation component 5 is released, and the elastic member 712 drives the locking pin 715 to be locked in the first slot 1011.

More specifically, a side, facing the action portion 534, of the fitting portion 714 is formed with a fitting surface 7140, and the fitting surface 7140 is an inclined slope. When the blower vacuum 100 is in the suction mode, in the process of pressing the first button and the second button, the action portion 534 moves downward along the inclined fitting surface 7140, and drives the fitting portion 714 to move toward the base 52 to be disengaged from the second slot 1012. The elastic member 712 is in a compressed state. In this case, if the operation component 5 is rotated to the blowing position, the first button 531 and the second button 532 are released, and the elastic member 712 is in a released state. The released elastic member 712 drives the locking pin 715 and the first slot 1011 to be engaged.

It may be understood that in this implementation, the press member 53 is provided with two buttons. Certainly, in some other embodiments, the press member 53 may be provided with one button. To prevent the buttons from being excessively released when the locking mechanism 71 is locked to the first slot 1011 or the second slot 1012, in this implementation, the limit member 54 is further provided with two limit teeth 541 in an extending direction of the through hole. The slide portion 535 of the button 5 is limited between the two limit teeth 541, so as to move between the two limit teeth 541 by the preset distance. In addition, the limit member 54 further includes two hooks 542 disposed opposite. The two hooks 542 fit the base portion 713 of the locking mechanism 71 to prevent the locking mechanism 71 from being disengaged from the hand wheel 51 in the transverse direction.

The action process of the garbage bag 7 during switching between blowing and suction is described below.

In an example, in the suction mode, the air outlet portion 332 of the volute 33 is connected in a sealed manner to the connection port 73 of the garbage bag 7. In an optional solution, a garbage bag 3 is movably mounted on the body 1. During switching from the suction mode to the blowing mode, the garbage bag 3 may first be moved away from the rotational axis A. Next, the airflow generation apparatus (the volute 33) rotates to the blowing mode. During switching from the blowing mode to the suction mode, first, the airflow generation apparatus (the volute 33) is rotated to the suction mode. Next, the garbage bag 3 moves toward the rotational axis A, so that the connection port 32 of the garbage bag 3 is connected in a sealed manner to the air outlet portion 332 of the volute 33. Certainly, the present invention is not limited thereto.

A connection manner between the air inlet portion 331 and the air outlet portion 332 of the volute 33 and the blowing-suction tube 2 is further described below.

In the suction mode, the air inlet portion 331 of the volute 33 is sleeved over the first end 21 of the blowing-suction tube 2 to implement sealing. In the blowing mode, a fastening portion on an outer side of the air outlet portion 332 of the volute 33 is clamped to the first end 21 of the blowing-suction tube 2, to inhibit the shaking of the blowing-suction tube 2.

Referring to FIG. 1A to FIG. 2B, in this implementation, a cross-sectional area of an airflow channel of the air inlet portion 331 of the volute 33 in a direction perpendicular to an air inlet direction of the air inlet channel is greater than a cross-sectional area of an airflow channel of the air outlet portion 332 in a direction perpendicular to the air outlet direction thereof. For example, when the air inlet portion 331 and the air outlet portion 332 are both approximately tubular, the inner diameter of the air inlet portion 331 is greater than that of an outlet portion 82. Because the air inlet opening 3310 (the inner diameter) of the air inlet portion 331 is relatively large, in the suction mode, a relatively large air intake may be implemented, and debris such as leaves can easily enter the volute 33 through the blowing-suction tube 2 and the air inlet portion 331 and is crushed by the fan 32 into pieces to enter the garbage bag 3. The air outlet opening 3320 (the inner diameter) of the air outlet portion 332 is relatively small, in the blowing mode, a relatively fast air discharge speed can be implemented in the blowing-suction tube 2, thereby obtaining a relatively large blowing force.

Figure 2A:
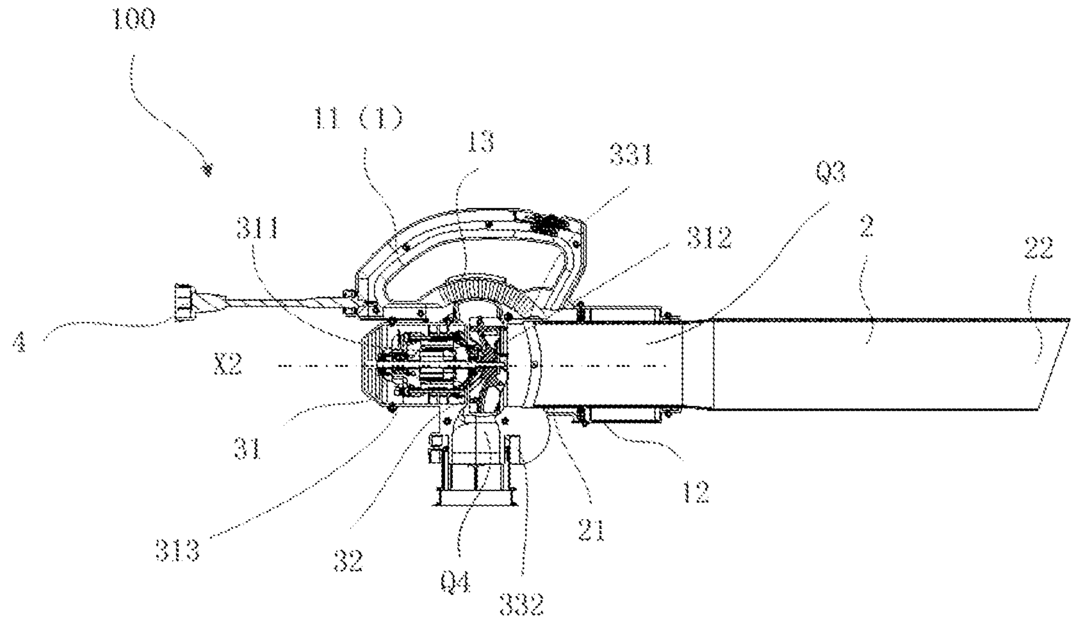
FIG. 2A shows a connection manner between an air inlet portion of a volute and a blowing-suction tube of the single-tube blower vacuum in FIG. 1.

Referring to FIG. 2A, the inner diameter of the air inlet portion 331 matches the outer diameter of the first end 21 of the blowing-suction tube 2, so that in the suction mode, the air inlet portion 331 is sleeved over the first end 21 of the blowing-suction tube 2. The present invention is not limited to that the inner diameter of the air inlet portion 331 matches the outer diameter of the first end 21 of the blowing-suction tube 2. The outer diameter of the air inlet portion 331 may further match the inner diameter of the first end 21 of the blowing-suction tube 2.

Figure 2B:
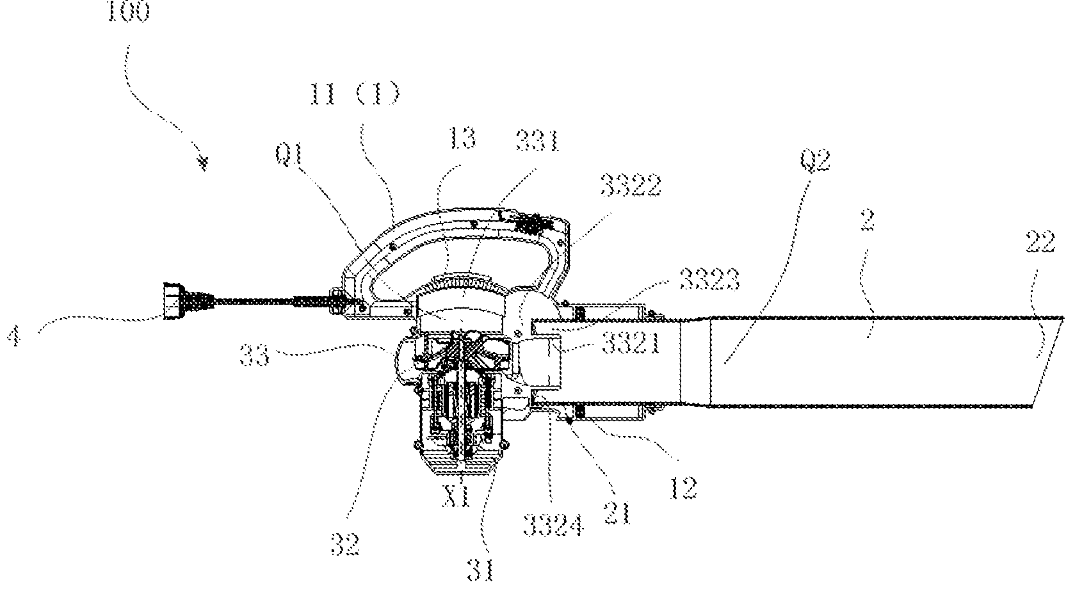
FIG. 2B shows a connection manner between an air outlet portion of a volute and a blowing-suction tube of the single-tube blower vacuum in FIG. 1.

Referring to FIG. 2B, the air outlet portion 332 includes an inner tube 3321 and an external fastening portion 3322 that are disposed generally approximately. The inner tube 3321 and the external fastening portion 3322 are connected to each other at base ends thereof, that is, at a connecting portion 3324, so that a clamping groove 3323 generally extending in a circumferential direction and an axial direction of the blowing-suction tube 2 is defined between the inner tube 3321 and the external fastening portion 3322. The outer diameter of the inner tube 3321 is less than the inner diameter of the first end 21 of the blowing-suction tube 2. In the blowing mode, the inner tube 3321 is accommodated in the first end 21 of the blowing-suction tube 2. The external fastening portion 3322 may be disposed as a plurality of parts at intervals in the circumferential direction of the blowing-suction tube 2. The inner circumferential shape of the external fastening portion 3322 matches the external circumferential shape of the first end 21 of the blowing-suction tube 2, so that in the blowing mode, the external fastening portion 3322 is externally connected to the first end 21 of the blowing-suction tube 2. The present invention may be, but is not limited to that the connecting portion 3324 defines the position of the first end 21 of the blowing-suction tube 2.

The present invention is not limited to that the inner diameter of the external fastening portion 3322 matches the outer diameter of the first end 21 of the blowing-suction tube 2. The external fastening portion 3322 may further match the inner diameter of the first end 21 of the blowing-suction tube 2. In this case, a step may further be formed at the external fastening portion 3322. The step may be held against the first end 21 of the blowing-suction tube 2, to implement axial positioning of the blowing-suction tube 2 in the blowing mode. Certainly, an axial positioning manner of the blowing-suction tube 2 is not limited thereto.

The connecting portion 3324 preferably does not extend in the entire circumference of the blowing-suction tube 2. This ensures that an annular space between the first end 21 of the blowing-suction tube 2 and the inner tube 3321 is in fluid communication with the inside of the body 1 and the outside of the volute 33.

Further, a cross-sectional area of the inner tube 3321 in a direction perpendicular to the air outlet direction is less than a cross-sectional area of the first end 21 of the blowing-suction tube 2 in the direction perpendicular to the air outlet direction. In this implementation, the inner tube 3321 extends into the first end 21 of the blowing-suction tube 2. A section in communication with external air is provided between the inner tube 3321 and the first end 21. In the blowing mode, because of Bernoulli's principle, external air is sucked into the blowing-suction tube 2 through this section under the effect of an airflow of the inner tube 3321, thereby increasing an air volume of the blower vacuum 100 in the blowing mode.

It should be understood that in the blowing mode, the inner tube 3321 does not necessarily extend into the first end 21 of the blowing-suction tube 2. The inner tube 3321 may further be separate from the first end 21 of the blowing-suction tube 2 by a distance in the extending direction of the blowing-suction tube 2. Alternatively, the port of the inner tube 3321 and the port of the first end 21 may be flush with each other, that is, generally in the same plane.

In the foregoing description, for simplicity, a horizontal placement state of the blowing-suction tube 2 is used to describe the relationship between parts. However, it should be understood that during use, the blowing-suction tube 2 is usually inclined relative to the horizontal direction.

Second Implementation

Figure 5:
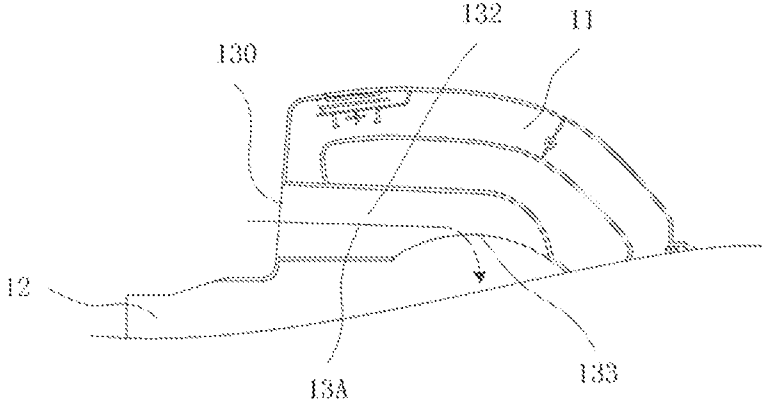
FIG. 5 shows a partial structure of a body of a single-tube blower vacuum according to a second implementation of the present invention.

The second implementation of the present invention is described below with reference to FIG. 5.

In the first implementation, the body air inlet portion 13 is located below the holding portion 11. However, the present invention is not limited thereto.

For example, in this implementation, the body air inlet portion 13 includes an air inlet channel 132 located below the holding portion 11, an opening 130 located at one end of the air inlet channel 132, and an exit 133 located at the other end of the air inlet channel 132. The opening 130 is located on a front side of the holding portion 11. That is, the opening direction of the opening 130 is basically consistent with the extending direction of the blowing-suction tube. In the blowing mode, incoming air generally flows along an arrow 13A to enter the volute 33 through the body air inlet portion 13.

In this implementation, the opening 130 of the body air inlet portion 13 faces a front-side opening of the body 1. Compared with that the opening of the body air inlet portion 13 is located below the holding portion 11, the opening 130 is less likely blocked by a hand holding the holding portion 11. In addition, the opening 131 or an airflow at the opening 131 is far away from the ears of a user. Therefore, noise perceived by the user can be reduced.

Certainly, the opening 130 of the body air inlet portion 13 may be located at any position other than that facing the holding portion 11, and there may be a plurality of air inlet openings.

Third Implementation

The third implementation of the present invention is described below with reference to FIG. 6A to FIG. 6C.

Referring to FIG. 1A, in the suction mode, the output shaft of the motor 31 is parallel to the central axis of the blowing-suction tube 2, and the motor 31 and the rotational axis A are located at approximately at the same height. Referring to FIG. 1B, in the blowing mode, the output shaft of the motor 31 is perpendicular to the central axis of the blowing-suction tube 2, and the motor body 311 is located below the rotational axis A.

Generally, the weight of the motor 31 accounts for a very large part in the weight of the entire airflow generation apparatus 3. During switching from the suction mode shown in FIG. 1A to the blowing mode shown in FIG. 1B, the center of gravity of the motor 31 lowers, so that the switching is facilitated. During switching from the blowing mode shown in FIG. 1B to the blowing mode shown in FIG. 1A, the center of gravity of the motor 31 rises, and it takes a relatively large force to enable the airflow generation apparatus 3 to rotate to the blowing mode shown in FIG. 1A. This implementation is provided to resolve the problem that it takes a relatively large torque to switch from the blowing mode to the suction mode.

Figure 6A:
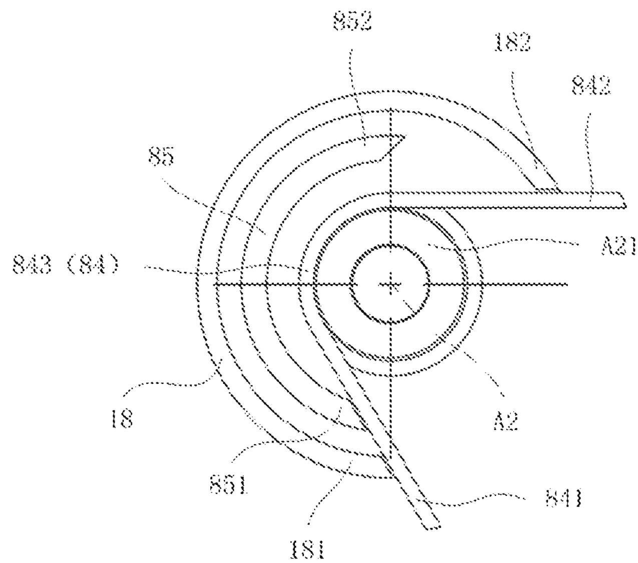
FIG. 6A to FIG. 6C show a schematic diagram of a switching assisting apparatus according to a third implementation of the present invention.
Figure 6B:
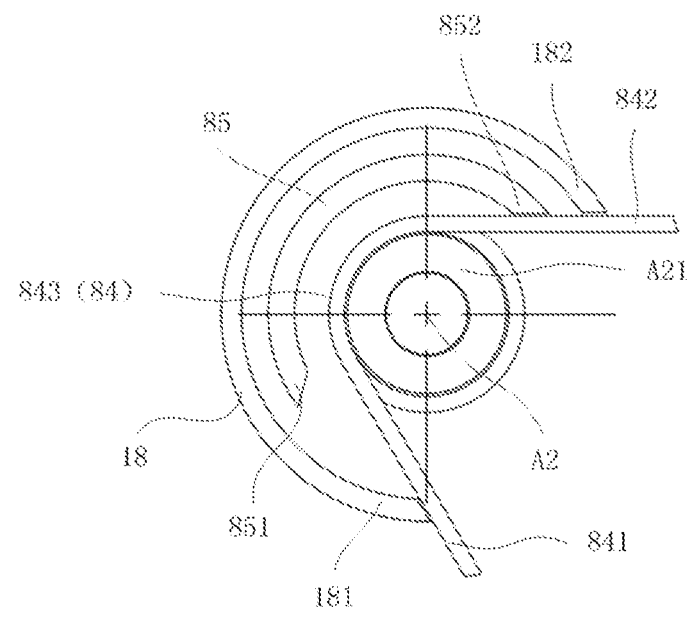
Figure 6C:
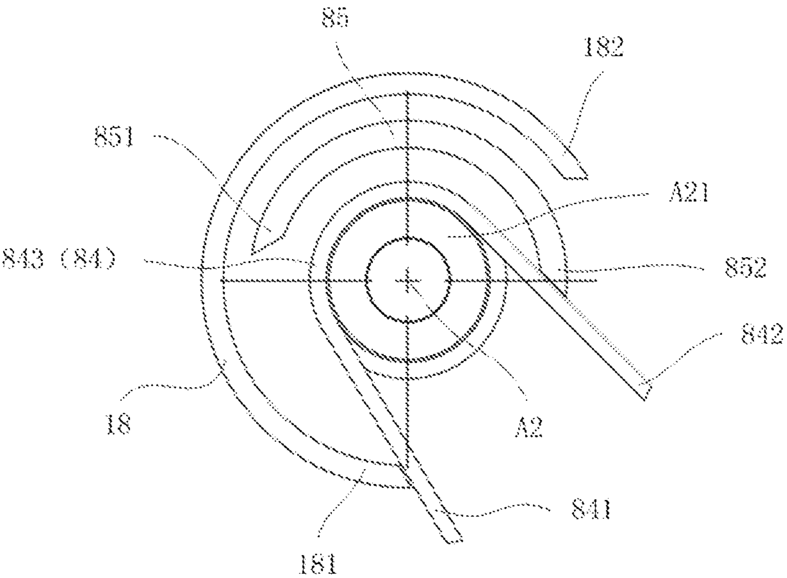

Referring to FIG. 6A to FIG. 6C, the airflow generation apparatus 3 includes a rotational axis A2 corresponding to the rotational axis A. The rotational axis A2 is fixedly connected to the volute 33. The airflow generation apparatus 3 further includes a switching assisting apparatus 8. The switching assisting apparatus includes a torsion spring 84, a torsion spring limit portion 18, and an abutting portion 85. As described below in detail, the switching assisting apparatus resists the torque around the rotational axis A2 applied by the weight of the motor 31 or the entire airflow generation apparatus 3. The stored energy may rotate in a direction opposite a rotational direction around the rotational axis A2 applied by the weight of the airflow generation apparatus 3.

Referring to FIG. 6A, a convex pillar A21 for mounting the torsion spring 84 is disposed at a position coaxial with the rotational axis A2 on an outer wall of the volute 33. A coil 843 of the torsion spring 84 is mounted around the pillar A21. A first arm 841 and a second arm 842 of the torsion spring 84 extend from the coil 843. The abutting portion 85 formed around the convex pillar A21 is disposed on the outer wall of the volute 33. The abutting portion 85 has the form of a generally C-shaped rib and includes a first end 851 and a second end 852. At least the coil 843 of the torsion spring 84 is disposed between the abutting portion 85 and the convex pillar A21. The torsion spring limit portion 18 is disposed around the abutting portion 85 on the housing of the body 1. The torsion spring limit portion 18 also has an approximately C shape. In the example shown in the figure, an angle by which the torsion spring limit portion 18 extends (covered by the C-shaped structure) is greater than an angle by which the abutting portion 85 extends. The torsion spring limit portion 18 has a first end 181 and a second end 182. Preferably, the abutting portion 85 and the torsion spring limit portion 18 are coaxially disposed with the rotational axis A2.

FIG. 6A shows that the blower vacuum is in the suction mode. FIG. 6C shows that the blower vacuum is in the blowing mode. FIG. 6B shows an intermediate state between the blowing mode and the suction mode. For example, during switching from the suction mode to the blowing mode, as the volute 33 rotates by 90 degrees, the state shown in FIG. 6B may be a state of rotating from the blowing mode or the suction mode by approximately 45 degrees.

In the blowing mode shown in FIG. 6A, the first end 181 and the second end 182 of the torsion spring limit portion 18 respectively limit the positions of the first arm 841 and the second arm 842 of the torsion spring 84. The torsion spring 84 is in a free state or a slightly compressed (that is, the first arm 841 and the second arm 842 approach each other from the free state of the torsion spring 84) state. The first end 851 of the abutting portion 85 abuts the first arm 841 of the torsion spring 84. The second end 852 of the abutting portion 85 is separate from the second arm 842 of the torsion spring 84.

During switching from the suction mode shown in FIG. 6A to the suction mode shown in FIG. 6C, the volute 33 (the abutting portion 85) needs to rotate in the clockwise direction in FIG. 6A by 90 degrees. As shown in FIG. 6B, when the volute 33 (the abutting portion rotates by about 45 degrees, the first end 851 of the abutting portion 85 is already separate from the first arm 841 of the torsion spring 84, and the second end 852 of the abutting portion 85 starts to abut the second arm 842 of the torsion spring 84. During further switching from the intermediate state shown in FIG. 6B to the blowing mode shown in FIG. 6C, the volute 33 (the abutting portion 85) further rotates in the clockwise direction, the abutting portion 85 compresses the torsion spring 84, so as to store energy in the torsion spring 84. In this case, the first end 181 of the torsion spring limit portion 18 and the second end 852 of the abutting portion 85 limit a compressed state of a torsion ring 84.

Because the center of gravity of the motor 31 lowers during switching from the suction mode (referring to FIG. 1A) to the blowing mode (referring to FIG. 1B), the center of gravity of the motor 31 may be used to compress the torsion ring 84. In this way, during switching from the suction mode to the blowing mode, the volute 33 is prevented from suddenly rotating fast under the effect of the weight of the motor 31, so that the switching is smoother. It should be understood that the direction of the torque (or rotation) around the rotational axis A2 applied by the weight of the motor 31 or the entire airflow generation apparatus is consistent with the direction of rotation that compresses the torsion ring 84 or stores energy in the torsion ring 84.

During switching from a blowing state shown in FIG. 6C to the suction state shown in FIG. 6A, the volute 33 (the abutting portion 85) rotates in a counterclockwise direction in FIG. 6C. In this case, a compressed torsion spring 85 releases energy stored in the torsion spring to push the abutting portion 85 (the volute 33) to rotate from the blowing state to the suction state. In other words, the potential energy of the torsion spring 85 cancels out a part of the weight of the motor 31, so as to reduce a force that needs to be applied by a user to raise the motor 31 (the airflow generation apparatus), so that switching from the blowing state to the suction state is smoother.

It should be understood that the theme of this implementation is to use the potential energy stored in the torsion ring 84 to assist in the rotation of the airflow generation apparatus, so that switching between blowing and suction is smoother. With the teachings of the present invention, a person skilled in the art may conceive of other implementations. For example, the convex pillar A21 may be disposed or formed at the rotational axis A2 or the housing of the body 8 instead of the volute. For example, the potential energy generated from the stretching or compression of a spiral spring mounted between the housing of the body 1 and the airflow generation apparatus is used to assist in the rotation of the airflow generation apparatus. Therefore, the elastic member used as an energy accumulation portion may be, for example, a torsion spring or a spiral spring.

It should be understood that the torsion spring limit portion 18 is not necessarily a C-shaped structure, provided that it has a first limit portion 181 and a second limit portion 182 for limiting the first arm 841 and the second arm 842 of the torsion ring 84.

The first arm 841 of the torsion ring 84 is limited by the first limit portion 181. Therefore, the abutting portion 85 is not necessarily a C-shaped structure, provided that it can abut a first abutting portion 852 of the second arm 842 of the torsion ring 84 with the rotation of the volute 33. For example, during switching from the suction mode shown in FIG. 6A to the blowing mode shown in FIG. 6C, the abutting portion 85 abuts the second arm 842 of the torsion ring 84 as soon as the volute 33 rotates. In this case, the first abutting portion (852) of the abutting portion 85 may be used to limit the second arm 842 of the torsion ring 84 in the suction mode. Therefore, the second limit portion 182 of the torsion spring limit portion 18 may be omitted.

Figure 18:
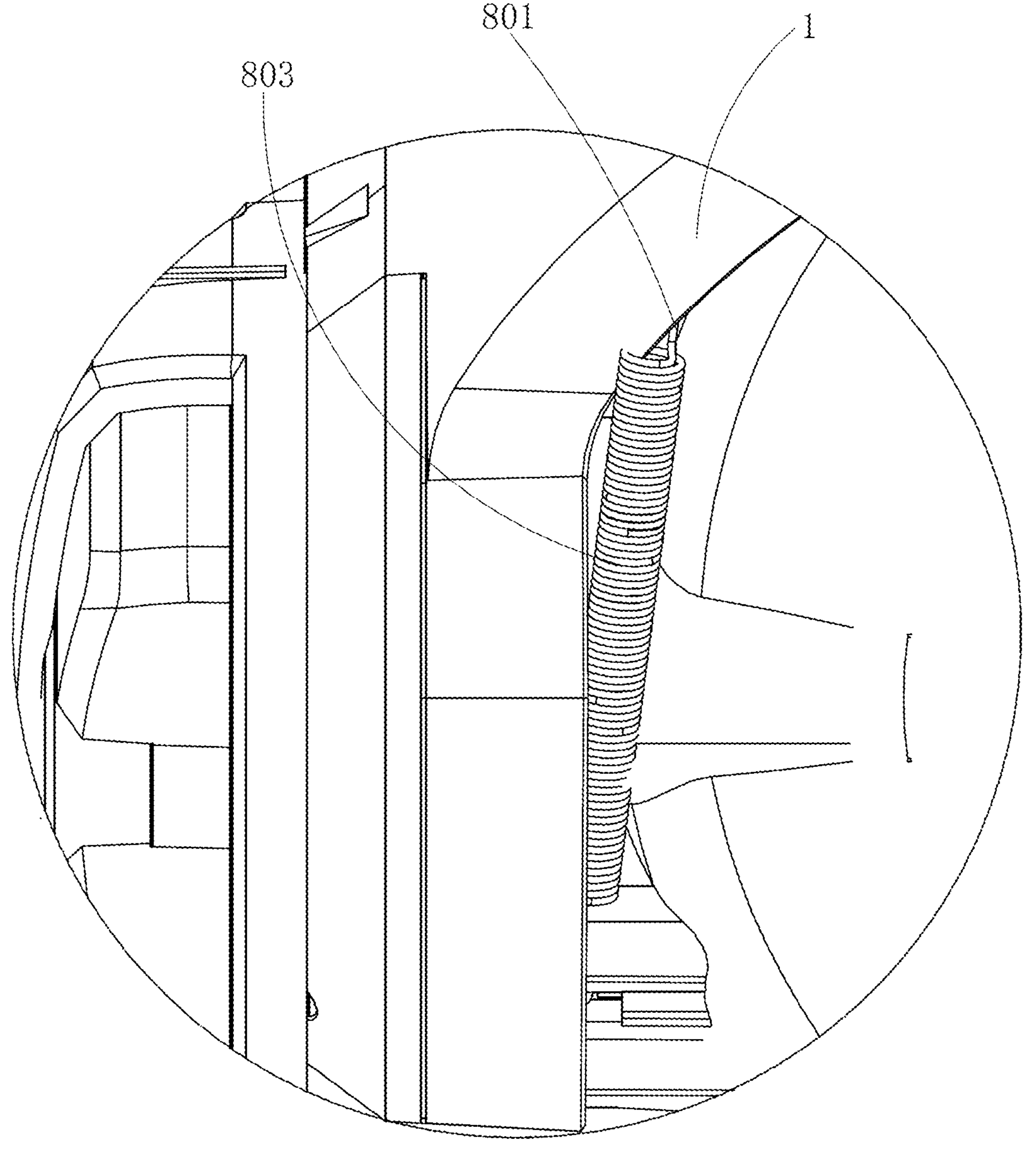
FIG. 18 is a partial enlarged view of the circled part in FIG. 17.

In the foregoing implementation, the torsion spring is mainly used to assist in the rotation of the airflow generation apparatus, so that switching between blowing and suction is smoother. Certainly, a switching assisting apparatus 8 may be alternatively an extension spring 80. Specifically, as shown in FIG. 17 and FIG. 18, the extension spring 80 includes a first retaining portion 801 connected to the body 1, a second retaining portion (not shown) connected to the airflow generation apparatus 3, and an elastic portion 803 connected between the first retaining portion 801 and the second retaining portion 802. The elastic portion 803 is disposed to be a spiral spring. When the blower vacuum is in the blowing mode, the elastic portion 803 is in a stretched state, and when the blower vacuum 100 switches from the blowing mode to the suction mode, the elastic portion 803 uses a restoring force thereof and coordinates with the blowing-suction switching mechanism to drive the airflow generation apparatus 3 to rotate.

Fourth Implementation

The fourth implementation of the present invention is described below with reference to FIG. 7.

This implementation focuses on the related size of the volute 33 to miniaturize the volute 33.

Figure 7:
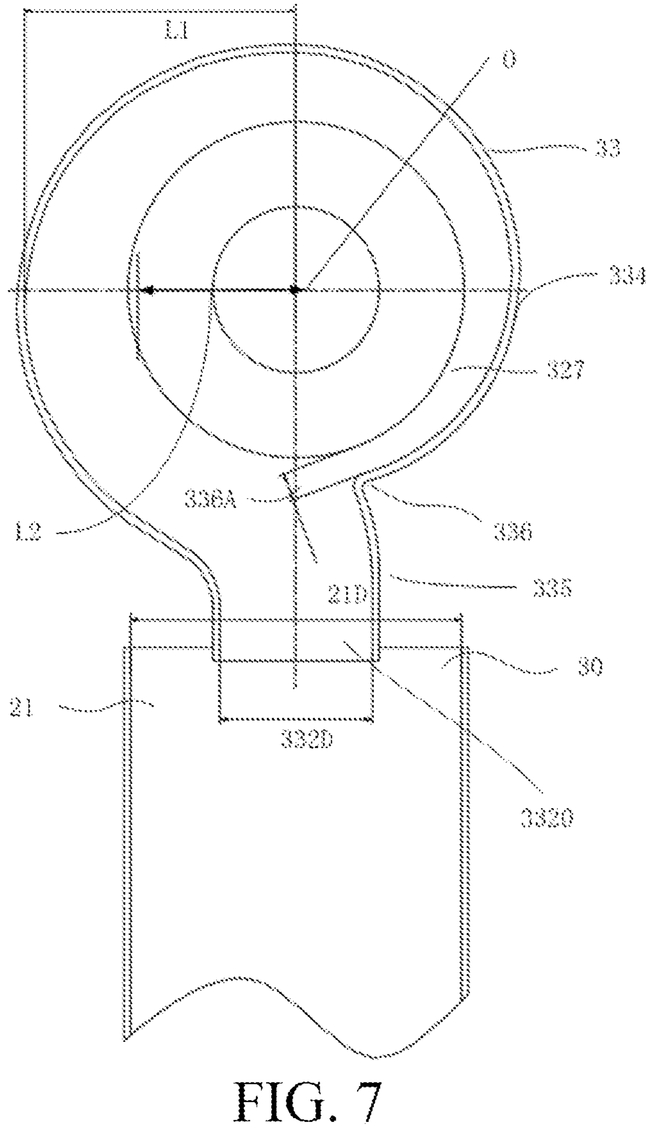
FIG. 7 is a sectional view of a volute according to a fourth implementation of the present invention.

FIG. 7 is a sectional view of the volute 33 taken along the rotational axis A (referring to FIG. 1A and FIG. 1B) of the volute 33 and the air outlet direction of the air outlet portion 332 (an inner tube 821) and also shows the first end 21 of the blowing-suction tube 2.

The volute 33 is one of core parts of a fan, and especially a centrifugal fan. The volute 33 is used for gathering gas from the centrifugal fan, guiding the gas to the air outlet opening 3320, that is, the air outlet portion 332, of the volute 33, and converting a part of dynamic pressure of the gas into static pressure. The volute 33 includes a spiral portion 334, a throat portion 335, and a volute tongue 336 formed between a starting end of the spiral portion 334 and the throat portion 335. The volute tongue 336 is near the air outlet opening 3320 of the volute 33 of the fan. The volute tongue is used for splitting an airflow guided to the air outlet opening 3320 of the volute 33, to prevent a part of gas from circulating in the volute 33. The volute tongue 336 cuts a high-speed airflow discharged from the fan 32, generating much noise. A distance between the volute tongue 336 and an edge 327 of the fan is increased to effectively reduce noise.

In this implementation, the distance that is marked by the numeral 336A and is from the volute tongue 336 to the edge 327 of a vane (a blade) is greater than or equal to 0.05 times of the diameter of the fan. In one of the implementations, the distance between the volute tongue 336 and the edge 327 of the fan (the blade) is 0.08 times to 0.12 times of the diameter of the fan. Preferably, the distance 336A from the volute tongue 336 to the edge 327 of the fan is greater than or equal to 8 mm. More preferably, the distance 336A from the volute tongue 336 to the edge 327 of the fan is 9 mm to 15 mm. It should be noted that the numeral 336A herein may be understood as the smallest distance between the volute tongue 336 and the edge 327 of the vane.

The radial size of the volute 33 affects the distance between the machine and the legs of a person when a user holds the blower vacuum. By reducing the radial size of the volute 33, an unfolding angle of arms can be reduced, thereby improving human-machine interaction friendliness and facilitating the rotation of the air generation portion to implement switching between blowing and suction. As shown in FIG. 7, in the direction perpendicular to the air outlet direction of the air outlet portion 332, the largest distance between a rotational center O of the fan 32 of the volute 33 and an inner wall of the volute 33 is L1, and the distance between the rotational center O of the fan to the edge of the blade is L2. A ratio of the distance L1 to the distance L2 is greater than or equal to 1.2 and is less than or equal to 2. Therefore, the ratio may be 1.3, 1.4, 1.5, 1.6, 1.7, 1.8 or 1.9. Preferably, the ratio of the distance L1 to the distance L2 is greater than or equal to 1.8 and is less than or equal to 2. In this implementation, in one aspect, the distance between the edge of the fan 32 and the inner wall of the volute 22 is reduced, to reduce the radial size of the volute 33. In another aspect, the distance between the volute tongue 86 and the edge of the fan is increased to reduce severe noise caused by the distance between the inner wall of the volute and the edge of the fan. Specifically, the largest distance L1 between the rotational center of the fan of the volute 33 and the inner wall of the volute 33 is less than or equal to 117 mm. In addition, a ratio of the distance 336A to the distance L1 is greater than or equal to 8/117=0.06. The ratio is, for example, 0.07, 0.09 or 0.12.

To reduce the radial size of the volute 33 and at the same time ensure the blowing and suction efficiency, in this implementation, the thickness of the volute 33 is increased to balance the volume of the volute 33, thereby ensuring that a sufficient volume of air enters the volute 33. Specifically, as shown in FIG. 10, in an extending direction of the rotational axis of the fan 32, the largest distance between two opposite inner walls of the volute 33 is W1, the height of the fan is W2, and a ratio of the largest distance W1 to the height W2 is greater than 1. Preferably, the range of the ratio is greater than 1 and less than or equal to 1.3. Therefore, the ratio may be 1.1, 1.17, 1.18, 1.19, 1.21, 1.25, 1.26, 1.27, 1.28 or 1.29.

In this implementation, the cross-sectional area of the air outlet opening 3320 of the volute 33 is reduced to increase the air speed. An auxiliary air outlet area (gap) 30 in communication with the outside is formed between the air outlet opening 3320 of the volute and the first end 21 of the blowing-suction tube 2 to increase an air outlet volume in the blowing mode. Specifically, as shown in FIG. 7 and FIG. 9, in the blowing mode, there is a gap between the air outlet opening 3320 and the first end 21 of the blowing-suction tube 2, so that an external airflow can enter the blowing-suction tube 2 through the gap 30. In addition, the air outlet opening 3320 and the first end 21 at least partially overlap in the axial direction or a front end surface of the air outlet opening 3320 is flush with a rear end surface of the first end 21.

The cross-sectional area of the air outlet opening 3320 of the volute 33 in the direction perpendicular to the air outlet direction needs to fall in an appropriate range. The cross-sectional area of the blowing-suction tube 2 in the air outlet direction needs to be combined and the blowing and suction efficiency needs to be considered. When the cross-sectional area of the air outlet opening is excessively small, leaves may clog in the suction mode, and when the cross-sectional area is excessively large, a negative pressure generated in the blowing mode is relatively small, and the effect of driving surrounding air to flow into the blowing-suction tube 2 to increase an air volume is not obvious. In this implementation, the range of a ratio of the cross-sectional area of the first end of the blowing-suction tube 2 to that of the air outlet opening 3320 of the volute is 1.5 to 6. Preferably, the range of the ratio of the cross-sectional area of the first end of the blowing-suction tube 2 to that of the air outlet opening 3320 of the volute is 3 to 5. Specifically, the range of the ratio may be 4, 4.2, 4.5, 4.6 or 4.8. In an example, as shown in FIG. 7, the diameter 332D of the air outlet opening 3320 of the volute 33 is 50 mm to 80 mm, and the diameter 21D of the first end 21 of the blowing-suction tube 2 is 100 mm to 130 mm. It should be noted that the first end herein may be understood as a circular opening, near the airflow generation apparatus, of the blowing-suction tube 2.

Fifth Implementation

The fifth implementation of the present invention is described below with reference to FIG. 8A and FIG. 8B.

Different from the first implementation, in this implementation, the airflow generation apparatus (the volute 33 and the motor 31) does not rotate relative to the body 1 (the holding portion 11). Instead, alternatively, the blowing-suction tube 2 may rotate relative to the body 1 and the airflow generation apparatus, to implement switching between blowing and suction.

Figure 8A:
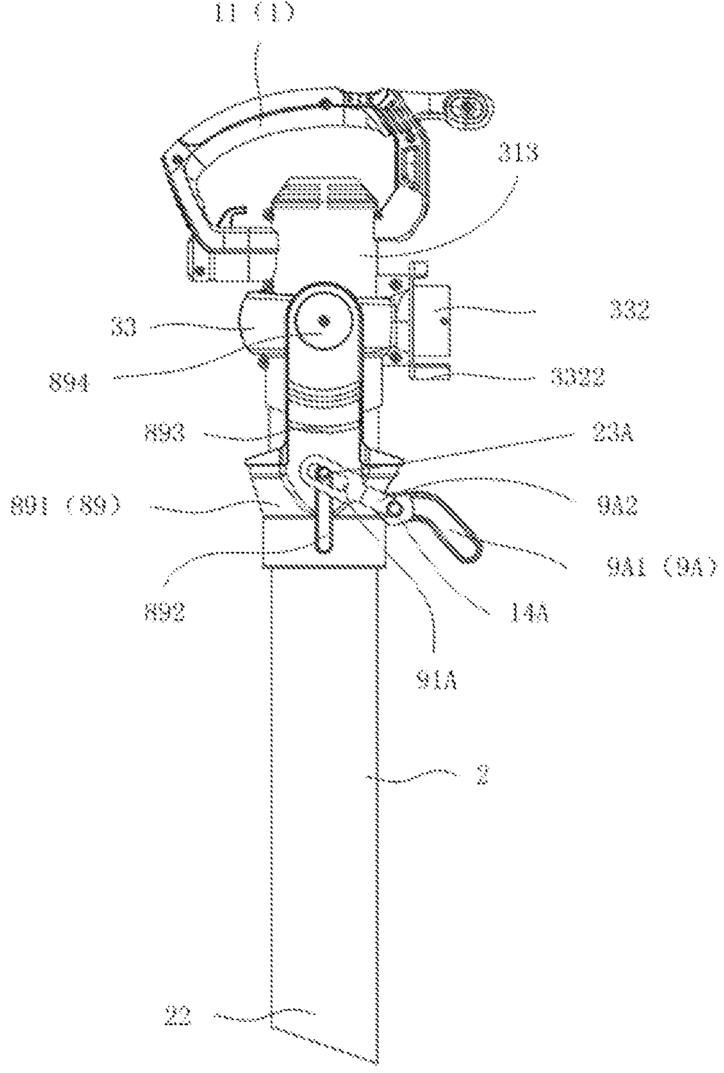
FIG. 8A and FIG. 8B show a single-tube blower vacuum according to a fifth implementation of the present invention, where in FIG. 8A, the single-tube blower vacuum is in a suction mode, and in FIG. 8B, the single-tube blower vacuum is in a blowing mode.
Figure 8B:
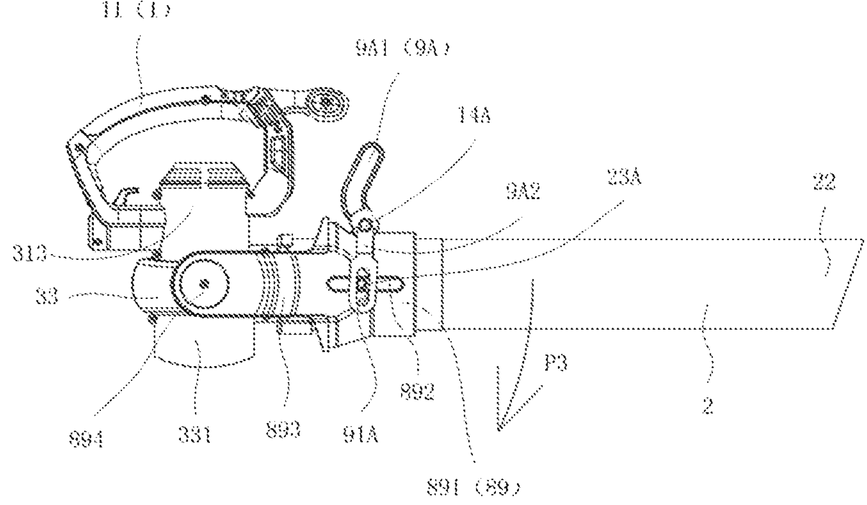

Referring to FIG. 8A and FIG. 8B, in this implementation, in the airflow generation apparatus, more specifically, the motor 31 and the volute 33 are fixedly connected to the body 1. The volute 33 includes an air inlet portion 331 and an air outlet portion 332.

The blower vacuum further includes a support 89 used for rotatably connecting the blowing-suction tube 2 to the volute 33. The support 89 includes a blowing-suction tube connecting portion 891 and a volute connecting portion 893, which may be integrally formed. The first end 21 of the blowing-suction tube 2 is connected to the blowing-suction tube connecting portion 891 and may make an axial movement relative to the blowing-suction tube connecting portion 891 along the central axis of the blowing-suction tube 2. The volute connecting portion 893 is rotatably connected to the volute 33 at the numeral 894. That is, the blowing-suction tube 2 can be pivotally disposed around the rotational axis A' with respect to the holding portion, and the blowing-suction tube 2 is rotatable between the blowing position and the suction position. At the blowing position (as shown in FIG. 8A), the rotational axis of the fan 32 is perpendicular to the extending direction of the blowing-suction tube 2. At the suction position (as shown in FIG. 8B), the rotational axis of the fan 32 is basically consistent with the extending direction of the blowing-suction tube 2.

In addition to that the blowing-suction tube 2 rather than the airflow generation apparatus rotates, in this implementation, connection manners between the blowing-suction tube 2 and the air inlet portion 331 and the air outlet portion 332, a manner of the axial movement of the blowing-suction tube 2 relative to the support 89, and a manner of switching between blowing and suction are similar to that in the first and second in this implementations.

The action process during switching between blowing and suction is described below.

In this implementation, the blowing-suction tube 2 is slidably connected to the blowing-suction tube connecting portion 891. As shown in FIG. 8A and FIG. 8B, a toggle 9A includes a first portion 9A1 and a second portion 9A2. The toggle 9A is pivotally mounted at the blowing-suction tube connecting portion 891 by a pivotal shaft 14A at an intersection between the first portion 9A1 and the second portion 9A2. An end of the second portion 9A2 is formed with a long hole 91A. A pivotal shaft 23A extending from the sidewall of the blowing-suction tube 2 is inserted in the axial long hole 892 in the support 89 and the long hole 91A in the toggle 9A. In this way, a first part 9A1 of the toggle 9A may be pushed to enable the toggle 9A to rotate around the pivotal shaft 14A, so as to drive the first end 21 of the blowing-suction tube 2 to move toward or away from the airflow generation apparatus (volute 33).

For example, during switching from the suction mode in FIG. 8A to the blowing mode in FIG. 8B, first, the first part 9A1 of the toggle 9A is pulled toward the holding portion 11 to enable the first end 21 of the blowing-suction tube 2 to move away from the volute 33 to be detached from the air inlet portion 331 of the volute 33. Next, the support 89 and the blowing-suction tube 2 are rotated together relative to the body 1 in the counterclockwise direction in FIG. 8A by 90 degrees, to enable the air outlet portion 332 of the volute 33 to be aligned with the first end 21 of the blowing-suction tube 2. Finally, the first part 9A1 of the toggle 9A is pushed to enable the first end 21 of the blowing-suction tube 2 to move toward the volute 33 to be joined to the air outlet portion 332 of the volute 33.

During switching from the blowing mode shown in FIG. 8B to the suction mode shown in FIG. 8A, the toggle 9A is pushed and the support 89 and the blowing-suction tube 2 are enabled to rotate in the direction of an arrow P3. In the blowing mode shown in FIG. 8A, the air outlet portion 332 is connected to the garbage bag. In the blowing mode shown in FIG. 8B, the air inlet portion 331 is exposed.

The foregoing implementations may be appropriately combined with each other. For example, the second implementation may be combined with the second implementation. The third implementation may be combined with the first implementation. The fourth implementation may be combined with the first to third implementations.

Certainly, the present invention is not limited to the foregoing implementations. A person skilled in the art may make various changes and variations to the foregoing implementations of the present invention with the teachings of the present invention without departing from the scope of the present invention.

(1) For example, the collection apparatus is not limited to the garbage bag 7. A part of the body 1 may be used as the collection apparatus.

The garbage bag 3 may be partially or nearly completely exposed from the body 1.

(2) People sometimes collectively refer a motor, a vane (a blade), and a housing including a volute as a fan. In this application, the fan does not include the foregoing motor and volute, includes vanes, and may further include a shaft connected to the fan.

(3) In the present invention, the blowing-suction tube 2 is not necessarily a straight tube.

In addition, the blowing-suction tube 2 does not necessarily have the same diameter at different positions in the axial direction thereof.

(4) In the blowing mode, the body air inlet portion 13 is not necessarily in direct communication with the air inlet portion 331 of the volute 33, and a gap may be kept therebetween.

(5) The guide rail (or the guide groove) 15 may be omitted. The inner circumferential surface of the blowing-suction tube connecting portion 12 may be used for guiding the blowing-suction tube 2.

What is claimed is:

1. A blowing suction device having a blowing mode and a suction mode, the blowing suction device comprising:

a body, comprising a grip portion to be held by an operator;

a power supply interface mounted on the body, an airflow generation apparatus, connected to the body, and comprising a motor, a fan driven by an output shaft of the motor and generating an airflow, and an inner housing that at least partially houses or covers the fan, the inner housing comprising an air inlet portion and an air outlet portion in communication with outside; and a blowing-suction tube, having an opening in communication with the outside for air flowing into or flowing out, wherein:

the inner housing is pivotally disposed around a rotational axis relative to the power supply interface and is rotatable between at least a blowing position in the blowing mode and a suction position in the suction mode, when the inner housing rotates to the blowing position, a first airflow flows into an inner cavity of the inner housing from the air inlet portion and then flows into the blowing-suction tube from the air outlet portion of the inner housing, and when the inner housing rotates to the suction position, a second airflow enters the air inlet portion of the inner housing from the opening and flows out from the air outlet portion.

2. The blowing suction device according to claim 1, wherein the grip portion extends longitudinally along a first axis, the blowing-suction tube extends longitudinally along a second axis, and when the inner housing rotates between the blowing mode and the suction mode, an angle formed between the first axis and the second axis remains unchanged.

3. The blowing suction device according to claim 1, wherein the blowing-suction tube is a single-cavity air tube, and when the blowing suction device is in the blowing mode or the suction mode, an extending direction of the blowing-suction tube remains unchanged.

4. The blowing suction device according to claim 1, wherein:

the air inlet portion comprises an air inlet opening capable of being in communication with the outside in the blowing mode, the air outlet portion comprises an air outlet opening allowing sucked foreign objects to flow to the outside, the fan is a centrifugal fan, the centrifugal fan comprises an air inlet side perpendicular to the output shaft of the motor and an air outlet side parallel to the output shaft of the motor, in the blowing mode, the air inlet opening is located right above the air inlet side, and the air outlet opening is located in front of the air outlet side, and in the suction mode, the air inlet opening is located in front of the air inlet side, and the air outlet opening is located right below the air outlet side.

5. The blowing suction device according to claim 1, wherein the airflow generation apparatus is an independent integral structure, and when the blowing suction device switches between the blowing mode and the suction mode, the independent integral structure is integrally rotatable relative to the grip portion.

6. The blowing suction device according to claim 1, wherein:

the blowing suction device further comprises a blowing-suction switching mechanism, the blowing-suction switching mechanism is capable of driving the inner housing to rotate relative to the grip portion to the blowing position in the blowing mode or to the suction position in the suction mode, when the inner housing rotates from the blowing position to the suction position, the blowing-suction switching mechanism is capable of driving a first end of the blowing-suction tube to face the air inlet portion, and when the inner housing switches from the suction mode to the blowing mode, the blowing-suction switching mechanism is capable of driving the first end of the blowing-suction tube to face the air outlet portion.

7. The blowing suction device according to claim 6, wherein:

the blowing-suction switching mechanism is capable of driving the first end of the blowing-suction tube to be away from the air inlet portion or the air outlet portion of the inner housing by a preset distance and is capable of linking the inner housing to rotate relative to the grip portion to the blowing position in the blowing mode or to the suction position in the suction mode, when the inner housing rotates from the blowing position to the suction position, the blowing-suction switching mechanism is capable of linking the first end of the blowing-suction tube to face the air inlet portion, and when the inner housing switches from the suction mode to the blowing mode, the blowing-suction switching mechanism is capable of linking the first end of the blowing-suction tube to face the air outlet portion.

8. The blowing suction device according to claim 7, wherein:

the blowing-suction switching mechanism is a linkage apparatus, and the linkage apparatus drives the blowing-suction tube to make an axial movement relative to the inner housing to enable the first end of the blowing-suction tube to be away from the air inlet portion of the inner housing or the air outlet portion of the inner housing by the preset distance.

9. The blowing suction device according to claim 7, wherein:

the blowing-suction switching mechanism is a linkage apparatus, the linkage apparatus comprises a connecting rod, a rotary disk pivotally mounted on the body, and a linkage member fixedly connected to the airflow generation apparatus, the rotary disk is further provided with a convex rod capable of being joined to the linkage member to drive the linkage member to rotate, one end of the connecting rod is pivotally connected to the first end of the blowing-suction tube, and another end of the connecting rod is pivotally connected to the rotary disk; and the connecting rod and the rotary disk form a crank connecting rod mechanism to convert a rotation of the rotary disk into an axial movement of the blowing-suction tube, and the rotary disk, the convex rod, and the linkage member form a Geneva mechanism, to convert a continuous rotation of the rotary disk into an intermittent rotation of the airflow generation apparatus relative to the grip portion through a joint between the connecting rod and the linkage member.

10. The blowing suction device according to claim 9, wherein the rotary disk comprises an anti-rotation plug at least partially protruding from the body, the linkage apparatus further comprises an operation component adaptively connected to the anti-rotation plug, and the operation component drives the rotary disk to rotate circumferentially.

11. The blowing suction device according to claim 1, wherein:

the body comprising a main unit housing connected to the grip portion, the main unit housing being provided with a second opening in communication with the outside, the main unit housing at least partially covers the inner housing, and the inner housing is pivotally disposed relative to the main unit housing and is at least rotatable between the blowing position in the blowing mode and the suction position in the suction mode.

12. A blowing suction device having a blowing mode and a suction mode, the blowing suction device comprising:

a body, comprising a grip portion to be held by an operator and a main unit housing, the main unit housing being provided with an opening in communication with outside;

a power supply interface mounted on the body;

an airflow generation apparatus, connected to the main unit housing, and comprising a motor, a fan driven by an output shaft of the motor and generating an airflow, and an inner housing that at least surrounds fan blades of the fan, wherein the main unit housing at least partially covers the inner housing, and the inner housing comprises an air inlet portion and an air outlet portion in communication with the outside;

a blowing-suction tube, having a tube opening in communication with the outside for air flowing into or flowing out, the blowing-suction tube being provided at a first end near the airflow generation apparatus; and a collection apparatus, used for collecting foreign objects blown out from the air outlet portion, the air inlet portion comprising an air inlet opening in fluid communication with the opening of the main unit housing in the blowing mode, and the air outlet portion comprising an air outlet opening capable of being connected to the collection apparatus in the suction mode, wherein:

the inner housing is pivotally disposed relative to the main unit housing and is rotatable relative to the body between at least a blowing position in the blowing mode and a suction position in the suction mode, when the inner housing rotates to the blowing position, the air outlet opening is opposite the first end of the blowing-suction tube, and when the inner housing rotates to the suction position, the air inlet opening is communicating with the first end of the blowing-suction tube.

13. The blowing suction device according to claim 5, wherein when the blowing suction device switches between the blowing position and the suction position, the motor does not rotate relative to the fan, and the motor is in a rotatable state relative to the body.

14. The blowing suction device according to claim 13, wherein in the blowing mode, an extending direction of the blowing-suction tube is basically consistent with an extending direction of the air outlet portion.

15. The blowing suction device according to claim 13, wherein in the suction mode, a tube opening of the blowing-suction tube is located right in front of an air inlet opening of the air inlet portion, and a rotational axis of the output shaft of the motor, a rotational axis of the fan, and a central axis of the blowing-suction tube basically coincide.

16. The blowing suction device according to claim 14, wherein in the suction mode, a first end of the blowing-suction tube is connected to the air inlet portion in a sealed manner.

17. The blowing suction device according to claim 13, wherein the blowing-suction tube is a straight tube, and a second end of the blowing-suction tube is formed with a tilted opening tilting in an extending direction of the blowing-suction tube.

18. The blowing suction device according to claim 1, wherein when the blowing suction device is in both the blowing mode and the suction mode, an axial distance between a foremost end of a tube opening of the blowing-suction tube and the rotational axis remains unchanged.

19. A blowing suction device having a blowing mode and a suction mode, the blowing suction device comprising:

a body, comprising a grip portion to be held by an operator and a main unit housing connected to the grip portion;

an airflow generation apparatus, connected to the main unit housing, and comprising a motor, a fan driven by an output shaft of the motor and generating an airflow, and an inner housing that at least surrounds fan blades of the fan, wherein the main unit housing at least partially covers the inner housing, and the inner housing comprises an air inlet portion and an air outlet portion in communication with outside;

a blowing-suction tube, having a tube opening in communication with the outside for air flowing into or flowing out, the blowing-suction tube being provided at a first end near the airflow generation apparatus; and a blowing-suction switching mechanism being capable of driving the first end of the blowing-suction tube to be away from the air inlet portion and/or the air outlet portion of the inner housing by a preset distance, and driving the inner housing to rotate relative to the grip portion or the main unit housing to a blowing position in the blowing mode or to a suction position in the suction mode, wherein:

when the inner housing rotates from the blowing position to the suction position, the blowing-suction switching mechanism is capable of driving the first end of the blowing-suction tube to face the air inlet portion, and when the inner housing switches from the suction mode to the blowing mode, the blowing-suction switching mechanism is capable of driving the first end of the blowing-suction tube to face the air outlet portion.

* * * * *